US011638061B1

(12) United States Patent
Sharma et al.

(10) Patent No.: US 11,638,061 B1
(45) Date of Patent: Apr. 25, 2023

(54) AUGMENTED REALITY DISPLAY FOR CONTENT CONSUMPTION RELATIVE TO A FIELD OF VIEW

(71) Applicant: Rovi Guides, Inc., San Jose, CA (US)

(72) Inventors: Saloni Sharma, Rajasthan (IN); Greeshma Jagadha Phani Lakshmi Alapati, Andhra Pradesh (IN); Harshith Kumar Gejjegondanahally Sreekanth, Karnataka (IN); Ishan Bhadula, Uttarakhand (IN); Simranjeet Gill, Punjab (IN); Sourabh Kumar, Bihar (IN); Srikanth Channapragada, Karnataka (IN); Vivek Sehgal, Uttar Pradesh (IN); Reda Harb, Bellevue, WA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/539,623

(22) Filed: Dec. 1, 2021

(51) Int. Cl.
*H04N 21/431* (2011.01)
*G06F 3/01* (2006.01)
*H04N 21/472* (2011.01)
*H04N 21/4363* (2011.01)
*H04N 21/45* (2011.01)
*H04N 21/41* (2011.01)

(52) U.S. Cl.
CPC ......... *H04N 21/4312* (2013.01); *G06F 3/013* (2013.01); *H04N 21/4126* (2013.01); *H04N 21/4363* (2013.01); *H04N 21/4516* (2013.01); *H04N 21/472* (2013.01)

(58) Field of Classification Search
None
See application file for complete search history.

(56) References Cited

U.S. PATENT DOCUMENTS

| | | |
|---|---|---|
| 2012/0154557 A1 | 6/2012 | Perez et al. |
| 2016/0098860 A1 | 4/2016 | Basra |
| 2017/0127114 A1 | 5/2017 | Lee |
| 2017/0201808 A1 | 7/2017 | Chowdhary et al. |
| 2019/0007750 A1* | 1/2019 | Tillman, Jr. ............ G06F 3/011 |
| 2019/0174149 A1* | 6/2019 | Zhang ................ H04N 21/2393 |
| 2020/0268296 A1 | 8/2020 | Alcaide et al. |
| 2021/0072877 A1 | 3/2021 | Kim et al. |
| 2021/0365233 A1 | 11/2021 | Grady et al. |

OTHER PUBLICATIONS

U.S. Appl. No. 17/539,620, filed Dec. 1, 2021, Saloni Sharma.

\* cited by examiner

*Primary Examiner* — Samira Monshi
(74) *Attorney, Agent, or Firm* — Haley Guiliano LLP

(57) ABSTRACT

Systems and methods are presented herein for generating an augmented reality ("AR") display with user interface ("UI") elements that respond to changes in pupil characteristics in response to detecting device streaming content. A media stream playing on a device that is within a threshold distance of the AR device is detected. The source of the media stream is identified. The AR device queries the source of the media stream for a consumption option. An AR overlay is generated and comprises selectable UI elements corresponding to the consumption options. In response to receiving an input at a UI element, the AR overlay is generated based on the consumption option.

18 Claims, 11 Drawing Sheets

AUGMENTED REALITY DISPLAY FOR CONTENT CONSUMPTION RELATIVE TO A FIELD OF VIEW

BACKGROUND

The present disclosure is directed to systems and methods for generating an augmented reality display for content consumption, and more particularly, to systems and methods that modify an interactive interface corresponding to the augmented reality display in response to eye-based inputs, wherein the interactive interface comprises options to manage streams accessible via an augmented reality device.

SUMMARY

Augmented reality (herein after "AR") involves overlaying visual, auditory, or other sensory information using a display such that when a user looks through the display, the user perceives their surroundings with interactive user interface (herein after "UI") elements (e.g., selectable or interactive icons). AR overlays comprise content and information with respect to attributes of a user's surroundings corresponding to a physical environment surrounding the user. AR devices and overlays paired together enable devices to enhance a user's experience with media content such that the user experiences their surroundings and the content simultaneously. An AR overlay enables the user to view the real world with an additional interactive layer of digital information projected into it (e.g., the overlay may be at least partially transparent to enable a user to remain aware of their surroundings while consuming content). The AR overlay may comprise two dimensional or three dimensional virtual icons as part of an interactive interface within the user's field of view (e.g., on a lens of a pair of smart glasses or on a screen of a device enabled to present video corresponding to the user's surroundings.

One approach incorporates a pairing of an AR device and the AR overlay generated by the AR device with an application, such as in the retail sector where the AR overlay may comprise a catalog of the items available via a store a user has entered. This approach enables a user to preview a product available through the store in different environments via the AR overlay. For example, a user may be able to request a virtual rendering of a piece of furniture in a room they are standing in such that when the user looks at a particular spot in the room, the piece of furniture is displayed as the user might see it. This approach, however, relies on pairing the AR device with at least a server corresponding to available information that can be accessed or manipulated through the AR overlay of the AR device. For example, an AR display may queue up options based on an automatically paired information source (e.g., a user accesses a quick response code, hereinafter "QR code") and a preconfigured overlay is generated on the AR display. In another example, a QR code may be scanned for a content item thereby presenting an overlay with subtitle or caption options. However, an AR display is intended to provide an augmented view of a user's surroundings. These current approaches fail to provide a user with an option to subscribe to different media streams within a field of view of the AR device and within a local network proximity. Additionally, these approaches fail to provide options to generate an AR overlay based on streams accessed from devices that are incapable of generating an AR overlay. For example, certain smart screens may access servers of content for streaming, but are not configured to generate an AR overlay or QR code for generating an AR overlay. As a result, a user is unable to either modify the generated overlay or be aware of other overlay options accessible to them (e.g., the user may only receive a notification that an AR overlay can be accessed or generated when a QR code is within a field of view of the AR device, and the user will not be able to create an augmented experience via their AR device while viewing content on a non-AR device).

Modification of the displayed information on either the AR display or the display of the remote device is not currently configured to be based on a user's preferences, nor is modification enabled for media streams detected that are outside the field of view of the AR device user. For example, subtitles or captions may be presented on the remote device display and the AR overlay in a default language based on a source device setting. A television may be displaying a media asset with subtitles in English while a user with an AR device may prefer the subtitles to be in another language, while other parties consuming the asset may prefer the English subtitles. Additionally, a user may wish to progressively gain control of another device that is receiving streamed content or is streaming content different from content displayed on the AR device, outside the field of view, to modify either the display of the remote device or the AR overlay. For example, a user may be a parent and there may be multiple children in a household, all streaming content on separate devices. The parent may wish to view what each child is streaming on their respective device and then may prefer to have options to modify or restrict the viewing of the content based on the subject matter being viewed (e.g., block or restrict objectionable content considering the age of the child or preferences of the parent). Preferably, an AR device is needed that can detect user preferences and modify the AR display in response to user inputs (e.g., including options to view content outside a field of view and, where needed, restrict or modify display of the content on a remote device that is currently streaming the content in addition to the AR device).

Described herein are systems and methods for generating an interactive and modifiable interface (e.g., AR overlay) on a display of an AR device based on modification instructions received via a communication stream between a source of content and the AR device, or, alternatively, based on available media streams that are being generated for display on remote devices that are accessible by the AR device (e.g., the remote devices are within a threshold distance of the AR device and the AR device has authorization to access and modify the display of the remote devices in addition to providing options to modify the AR overlay).

In some embodiments, a media stream is detected that is playing on a device that is within a threshold distance of the AR device. The source of the media stream is also identified (e.g., a content platform, an application, a device, or a server corresponding to a content provider). In response to identifying the source of the media stream played on the other device within the threshold distance of the AR device comprises, the AR device is used to query the source for a consumption option for the media stream. An AR overlay is generated using the AR device. The AR overlay comprises at least one user interface element that corresponds to the consumption option for the media stream. An input is received corresponding to an interaction with the at least one UI element. In response to receiving the input, at least one of (i) modifying the playing of the stream playing on the other device based on the consumption option and (ii) generating an AR overlay related to the consumption option at the AR device is performed. For example, modifying the playing of the stream on the other device comprising generating a playback of playback and parental control options on the AR overlay such that when a user of the AR overlay provides an input, the playback of the stream on the other device is modified (e.g., a trick play option may be executed on the other device based on an input to the AR overlay and the stream may be blocked or changed on the other device if a parental control option is selected on the AR device overlay). In another example, the consumption option corresponding to the input may comprise enabling captions for the AR overlay viewer without modifying the display of the other device on which the stream was originally detected.

In some embodiments, a media stream playing on a device that is outside a field of view of an AR device is detected that is within a threshold distance (e.g., detectable by a local communication network generated by the AR device). A device receiving the media stream is identified. In response to identifying the other device receiving the media stream, at least one UI element is generated on a display that corresponds to the AR device. The at least one UI element conveys information corresponding to content available via the media stream. An input corresponding to the at least one UI element is received. In response to receiving the input, an AR overlay is generated that comprises a mirror of the media stream playing on the other device.

These techniques solve the problems of other approaches described above. In particular, this approach does not rely on settings on a device receiving the stream to modify display settings corresponding to the stream or settings corresponding to a QR code associated with the available content stream. Thus, a user with an AR device can selectively preview, access, and modify display settings of available streams within a threshold distance of the AR device. Additionally, this approach does not require a direct line of sight or a preconfigured communication stream to be established in order for a user to view a media stream via an AR device overlay. By providing UI elements corresponding to various display options, as opposed to relying on previously established streams of communication and single device settings, the system can enable a user not only to modify their own display, but also to act as a parental control authority or content administrator by taking control of other displays corresponding to the media stream.

In some embodiments, the media stream playing on the other device is within a field of view of the AR device.

In some embodiments, detecting the media stream playing on the other device that is within the threshold distance of the AR device comprises determining a first location of the AR device and determining a second location of a source of the media stream. A distance between the first location and the second location is determined and then compared to the threshold distance (e.g., the threshold distance is set based on the size of a household that has multiple devices accessible by the AR device). In some embodiments, a local communication network at the AR device is activated. A distance corresponding to at least one device responsive to the local communication network, based on a response corresponding to the at least one device, is determined. The distance is then compared to the threshold distance.

In some embodiments, identifying the source of the media stream comprises identifying the source based on metadata associated with the media stream. In some embodiments, identifying the source of the media stream comprises identifying a content provider associated with the media stream. In some embodiments, identifying the source of the media stream comprises identifying a device associated with the media stream. Based on device configuration data of the other device (e.g., content platform subscription status), at least one content source available through the other device is determined and associated with the media stream.

In some embodiments, the at least one UI element comprises at least one identifier, wherein the at least one identifier is associated with at least one content item available via the media stream. In some embodiments, the at least one identifier comprises at least one of an image corresponding to content available via the media stream, a portion of at least one video available via the media stream, and at least one identifier of the source of the media stream.

In some embodiments, the consumption option comprises at least one of controlling the media stream on the other device, modifying display options corresponding to the media stream on the other device, controlling the media stream on the AR device, and modifying display options corresponding to the media stream on the AR device.

In some embodiments, receiving the input corresponding to the interaction with the at least one UI element comprises determining a change in a pupil characteristic of a pupil close to the AR display. The pupil characteristic may comprise at least one of a pupil size, a blink rate, and a light reflection magnitude.

In some embodiments, modifying the playing of the stream playing on the other device based on the consumption option comprises executing a modification instruction based on the consumption option. In some embodiments, the modification instruction comprises at least one of a playback command, a caption setting modification, and an interface display modification.

In some embodiments, the AR overlay comprises at least one UI element corresponding to an instruction to control display of the media stream on at least one of the other device and the AR device. In some embodiments, the at least one UI element which, when associated with the input, is configured to generate an instruction for modifying display of the media stream on at least one of the other device and the AR device (e.g., adding captions or subtitles, changing language settings, changing font sizes, changing brightness). The at least one UI may be associated with any modification corresponding to display of content from the media stream or any modification corresponding to the AR overlay.

BRIEF DESCRIPTIONS OF THE DRAWINGS

The above and other objects and advantages of the disclosure may be apparent upon consideration of the following detailed description, taken in conjunction with the accompanying drawings, in which.

DETAILED DESCRIPTION

Methods and systems are provided herein for generating an augmented reality display for content consumption and modifying an interactive interface corresponding to the augmented reality display in response to eye-based inputs.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, random access memory (RAM), etc.

Figure 1:
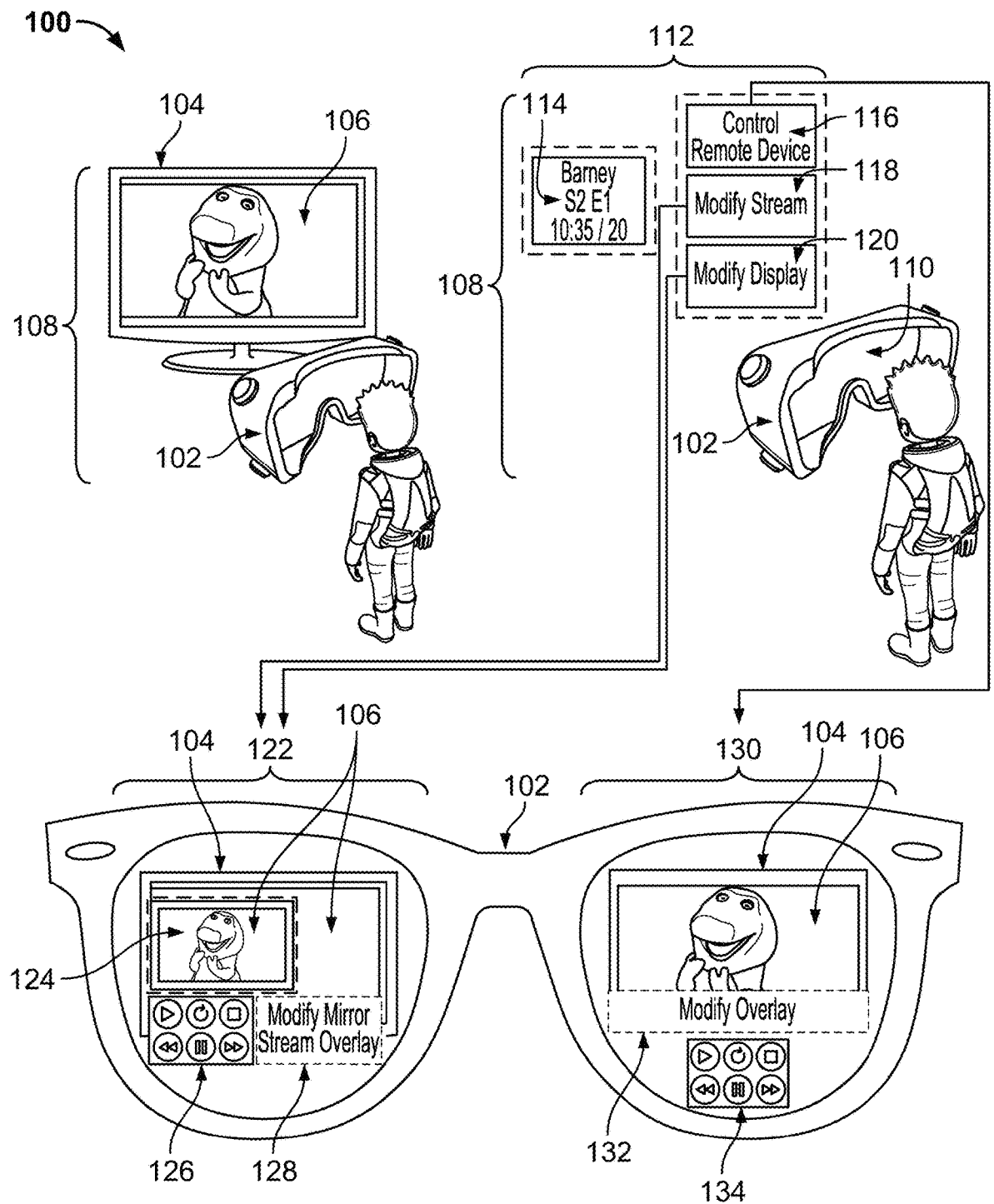
FIG. 1 illustrates a scenario in which an AR device detects a remote device displaying a media stream within a field of view of the AR device and the display of the AR device is modified with UI elements, in accordance with some embodiments of the disclosure.

FIG. 1 illustrates AR overlay modification scenario 100, where AR device 102 detects remote device 104 displaying media stream 106 within field of view 108 of AR device 102 and display 110 of the AR device is modified with UI elements 112, in accordance with some embodiments of the disclosure. UI elements 112 may comprise a semi-transparent interface to augment field of view 108 of a user of AR device 102. In some embodiments, UI elements 112 may be generated as solid icons on display 110 such that a user cannot view their environment behind UI elements 112. In other embodiments, UI elements 112 are generated as options when remote device 104 is within field of view 108 such that a user of AR device 102 may understand which device and stream the control options of UI elements 112 may correspond to. Additionally, UI elements 112 may comprise a plurality of each icon depicted depending on the number of accessible streams or devices detected, either in or out of field of view 108 (e.g., there may be one cluster of UI elements 112 on display 110 for each stream detected such as four clusters for each of four detected streams, where two streams might be within field of view 108 resulting in the generation of semi-transparent clusters of UI elements 112 on display 110 and two streams might be outside of field of view 108 resulting in the generation of solid or opaque clusters of UI elements 112).

Field of view 108 may, for example, be determined by a user's pupil range of motion and/or the size of display 110. AR device 102 may be secured to a user's head and may be configured to display an AR overlay (e.g., an overlay comprising UI elements 112). AR device 102 may request a user to perform a range of pupil motions (e.g., side to side and vertically) to determine the range of motion of a user's pupils with respect to display 110 of AR device 102. If a user is able to indicate at each edge of display 110 that the user can move their pupilss to each edge in order to provide an input at each edge of display 110 (e.g., a user can move their pupilss towards an edge of display 110 and then manipulate a pupil characteristic such as a blink when the pupil position is moved to be within a significantly small distance from the edge to indicate the user can view or detect the edge of display 110), then field of view 108 may be defined by the size of display 110. If a user is unable to indicate at each edge of display 110 that the user can move their pupilss to each edge of display 110, then AR device 102 may reduce field of view 108 based on the responsive range of the user's pupils with respect to display 110. AR device 102 may also comprise an apparatus that is not directly mounted to a user's head. In this scenario, field of view 108 may be dependent on a camera corresponding to AR device 102 that is configured to capture video of surroundings behind AR device 102. For example, AR device 102 may comprise a tablet or smartphone configured to generate a live feed of video of an environment behind display 110 of AR device 102. Field of view 108 in this example would be defined by the size of the portion of the environment behind display 110 that the camera is capable of capturing.

Figure 2:
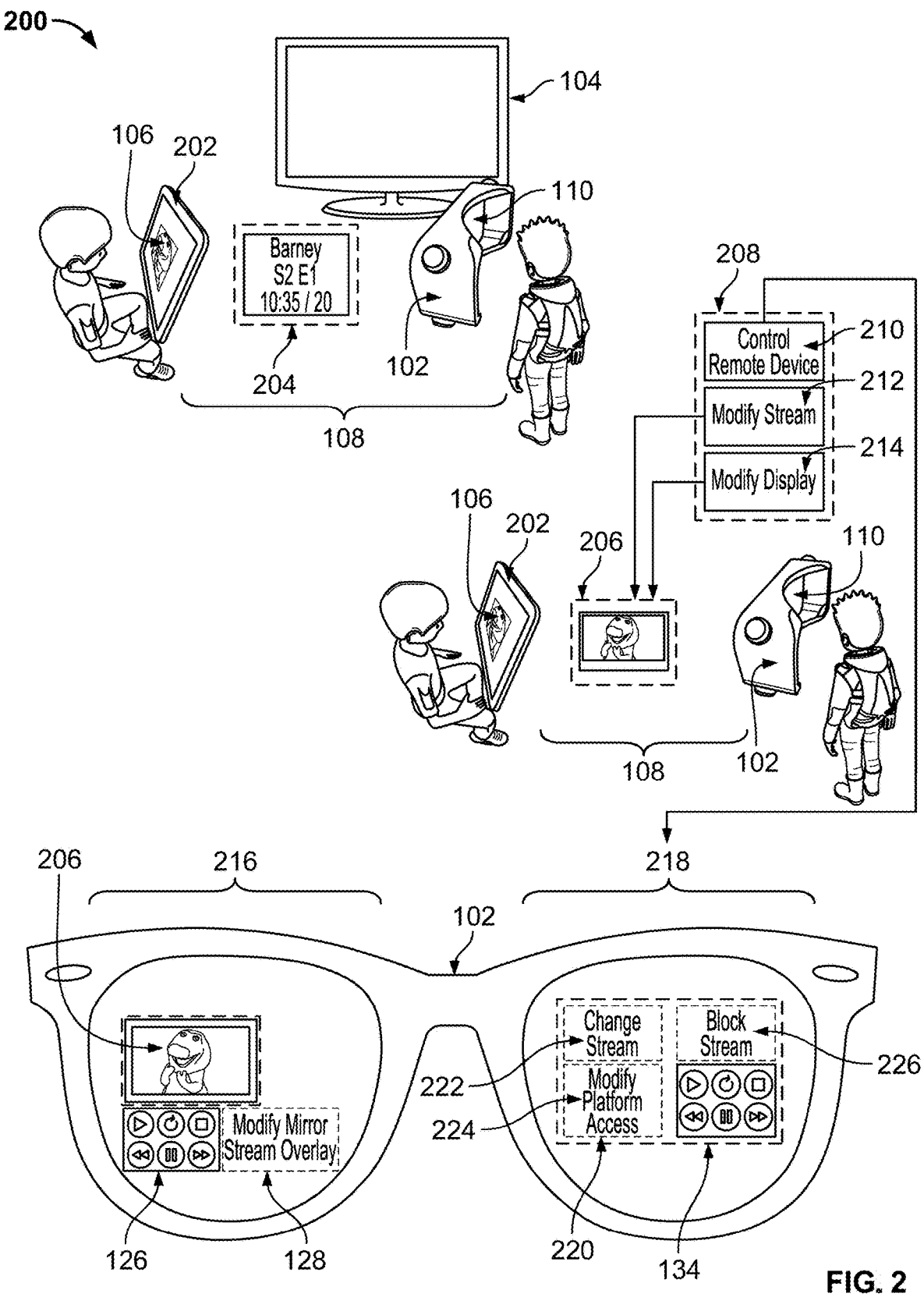
FIG. 2 illustrates a scenario in which an AR device detects a remote device displaying a media stream outside a field of view of the AR device and the display of the AR device is modified with UI elements, in accordance with some embodiments of the disclosure.
Figure 6:
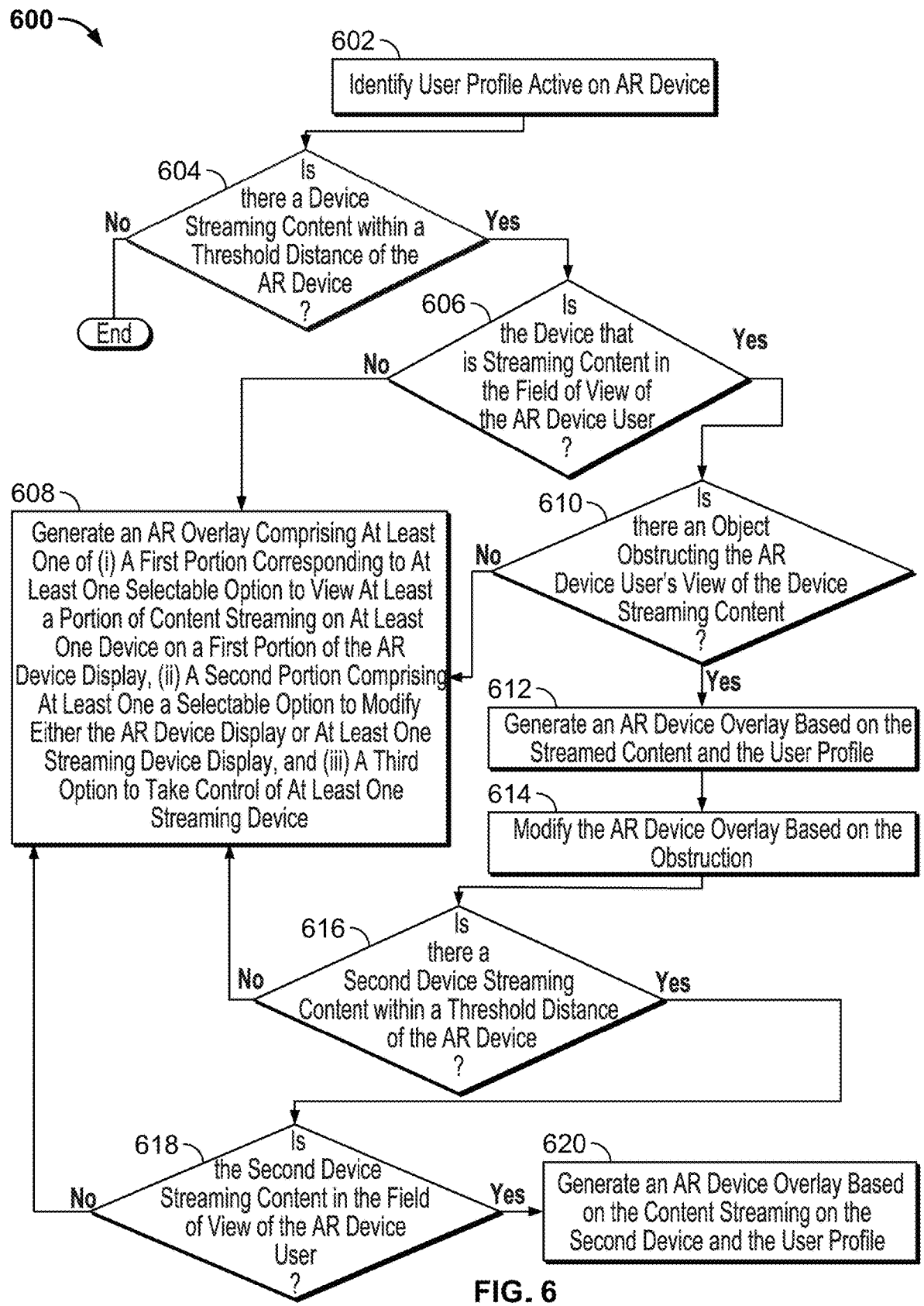
FIG. 6 is a flowchart representing an illustrative process for identifying a media stream in order modify an AR overlay, in accordance with some embodiments of the disclosure.
Figure 9A:
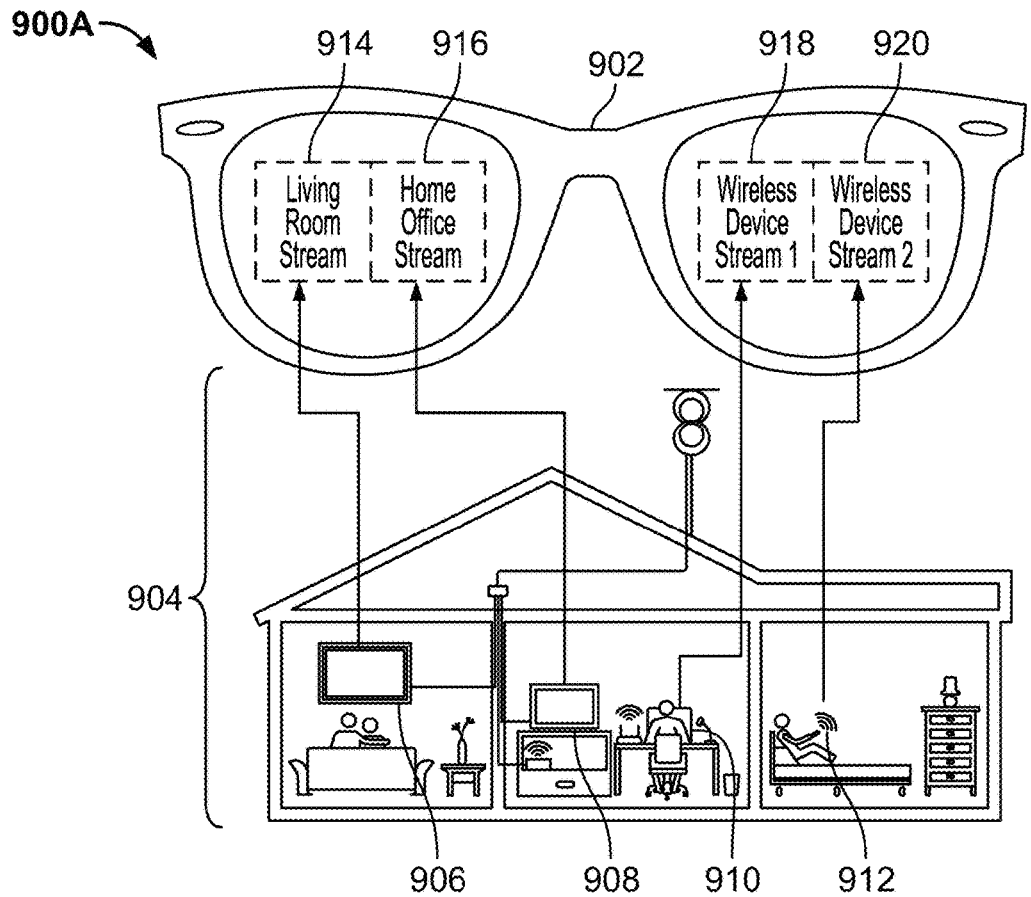
FIGS. 9A and 9B are exemplary AR overlays, in accordance with some embodiments of the disclosure.

When AR device 102 detects remote device 104 (e.g., based on a threshold distance such as 10 feet or based on a local network signal strength as generated by either AR device 102 or remote device 104), AR device 102 generates an interactive interface on display 110 based on information available about media stream 106 once field of view 108 of AR device 102 includes a display corresponding to remote device 104. The interactive interface may, for example, comprise an AR overlay used to augment a view of the surroundings as displayed on display 110 of AR device 102. The AR overlay may be configured to complement existing features viewable within field of view 108 via display 110 or may be configured to appear as a floating interface on display 110. In one example, if the AR overlay is configured to complement existing features viewable within field of view 108, then the AR overlay would be configured to be at least partially transparent and remain aligned with a display of a remote device (e.g., as shown in FIGS. 1, 2, and 6). Alternatively, if the AR overlay is configured to appear as a floating interface on display 110, then the elements of the AR overlay would appear more opaque than the semi-transparent embodiment and would not align with a display of a remote device (e.g., as shown in FIG. 9A where a user may not be able to see the displays of any remote devices but is able to detect which of the remote devices is streaming content). In some embodiments, the transparency or opaqueness of the AR overlay may be contingent on whether a remote device streaming content is within field of view 108 or may be based on a user preference or device display setting stored in association with AR device 102.

The interactive interface may also comprise selectable options to modify at least one of display 110 of AR device 102 or control the display of media stream 106 on remote device 104 (e.g., playback controls, display modification options, and/or parental controls). AR device 102 may detect remote device 104 by at least one of a local network connection, a visible device identifier such as a QR code, a virtual device watermark (e.g., the equivalent of a QR code transmitted via a local or public network connection), and a review of previously connected devices as compared to active devices (e.g., in an office space or household where a user has previously connected to each of the available remote devices). In one embodiment, a QR creation and insertion service updates the digital watermark payload in real time. Such service is in communication with the playback service (e.g., service communicating with the media player on a streaming device) as well as an advertising service (e.g., a service that is in communication with the playback service in order to serve ads during the streaming session). The QR creation and insertion service (hereinafter "QRCIS") can directly retrieve information from the ad service or from the playback service or both. Such information can be references to the ad creatives (e.g., videos) or URL to a product that will be shown during an ad placement. Any information necessary for the creation of the payload can be exchanged between the backend services through various formats (e.g., XML and/or JSON, depending on device compatibility). In some embodiments, the QR codes are also targeted and personalized. For example, a QR code can be constructed with a buy option for Smart Glass A, but not for Smart Glass B. Smart Glass B can be a different smart glass in a different location and has no relationship to Smart Glass A.

Icons generated as part of the interactive interface that would allow the user to perform a command can follow and track the user's eyes by moving the icons of the interactive interface to an area in the user's view where the user has been focused for a predetermined amount of time (e.g., 5 seconds). Similarly, the icons can pop out if it is determined that the extensive eye movement is potentially due to lack of text clarity. The eye movement data is constantly reported to a UI enhancement service that utilizes such data to make appropriate UI changes. Open source UI software libraries can be utilized for such customization. In one embodiment, a word or portion of a link is highlighted in order to allow the user to make a quick decision of whether they want to open the URL. This can be done in response to multiple links being displayed in the user's field of view. This can also occur in response to increased eye movement in horizontal or vertical directions.

Once AR device 102 detects remote device 104, information may be retrieved regarding remote device 104 and media stream 106. The information may be retrieved based on metadata attained via a local connection between AR device 102 and remote device 104, based on metadata retrieved from remote device 104 by AR device 102 by a network to which both remote device 104 and AR device 102 are connected, or based on at least one of a virtual watermark for remote device 104 or media stream 106 (e.g., a virtual watermark comprising a non-visible version of information stored in a visible QR code). After retrieving information, the information may be displayed, as part of the AR overlay generated on display 110 (e.g., as shown in portions 122 and 130). The information may include media stream source information (e.g., a content platform from which the media stream is accessible), as well as descriptive information related to media stream 106 (e.g., a title and serial programming information) in addition to selectable options. The selectable options may comprise at least an option to control or modify the remote device settings, an option to modify media stream 106, and/or an option to modify display 110 or an option to modify the display corresponding to remote device 104. In some embodiments, AR device 102 may detect remote device 104 or media stream 106 based on information available between the other devices via a local communication network, wherein the local communication network is generated by either AR device 102 or remote device 104. Additionally, AR device 102 may detect remote device 104 based on a mutual connection to a network in the area (e.g., both devices receive authorization to connect to a same router, a same wireless network, or receive authorization to communicate with each other via an application installed on both devices).

In one embodiment, a QR creation and insertion service updates the digital watermark payload in real-time. Such service is in communication with the playback service (e.g., service communicating with the media player on a streaming device) as well as an advertising service (a service that is in communication with the playback service in order to serve ads during the streaming session). The QR creation and insertion service (QRCIS) can directly retrieve information from the ad service or from the playback service or both. Such information can be references to the ad creatives (e.g., videos) or URL to a product that will be shown during an ad placement, etc. Any information necessary for the creation of the payload can be exchanged between the backend services through various formats (XML, JSON, etc.). In some embodiments, the QR codes are also targeted and personalized. For example, a QR code can be constructed with a buy option for Smart Glass A, but not for Smart Glass B. Smart Glass B can be a different smart glass in a different location and has no relationship to Smart Glass A.

In some embodiments, the personalized QR codes can be served to multiple smart glasses in the same vicinity (e.g., connected to the same network and watching the same content). A QR code's payload can indicate which smart glass the QR code is intended for (e.g., based on its unique ID such as a unique serial number). For example, the smart glass that the QR code is intended for is scanned, and a call (e.g., HTTP GET) is only made by the smart glass if the serial numbers in the payload and its serial number match. The QRCIS service can periodically insert tracking QR codes into the content to get an inventory of which smart glasses are present and/or watching a particular media stream. Other techniques can be used for QR targeting, such as enabling the Smart Glasses, while in the same vicinity, to consume the main content on different devices. In such case, which Smart Glass is paired with which streaming device is known and the appropriate codes can then be inserted into the stream associated with any of the respective smart glasses. Additionally, if multiple users are watching the main content on the same streaming device, and if their locations with respect to streaming device is known, then multiple QR codes can be transmitted with location information based on the smart glasses seating arrangement. For example, a first QR code can be present at the left side of the screen, and a second AR code might be present at the right side. A smart glass may comprise a plurality of cameras such that a left-oriented camera can be activated to scan the left side of a field of view of an AR device, while the other smart glass can utilize a right-oriented camera to scan for QR codes on the right side of a field of view of the AR device.

In some embodiments, display 110 generates an AR overlay comprising UI elements 112, which may be arranged in a menu or grid of selectable options. In some embodiments, the AR overlay structure is altered based on the available media stream sources the user profile active on AR device 102 has authorization to access. The overlay structure may be responsive to changes in a user's pupils or the movement of the user's pupils. In some embodiments, the AR overlay may be configured to enable a user to access or subscribe to either a content source or a media stream based on a user input (e.g., a user input that may be based on at least one of a user's eye or pupil movements and/or a change in a user's pupil characteristics, including pupil size and blinking rate). For example, the rapid movement of the eyes in two opposite directions (e.g., left to right) in order to read a closed caption or a subtitle could indicate that the text might be too long and should be presented in portions (e.g., broken into portions and displayed in a scrolling fashion). However, if the user is squinting their eyes, it might be determined that the font or size of the text need to be adjusted, such as increased or bolded. The direction of the pupil could also indicate which portion of the text the user is looking at, in which case, special formatting can be applied only to that portion of the text to speed up the processing.

In some embodiments, the AR device may be configured to provide a user with an option to join a group stream, wherein each member of the group stream may be able to share comments while viewing the same portion of a media stream. In some embodiments, the AR overlay may be configured to enable a user to take screen grabs of the media stream, or modify the media stream (e.g., creating a locally stored modified copy such as a music stream with a chorus removed). In some embodiments, the AR overlay may comprise parental control settings and notifications (e.g., a parent profile may be utilized to set available maturity ratings for their children's AR device profiles and may be notified of their children accessing unauthorized or questionable content, thereby providing the user with a restriction of content option). The parental controls may be enabled on the AR device profiles or any device that may be configured to access the AR device profiles.

In some embodiments, AR device 102 comprises a smart glass device. In some embodiments, AR device 102 comprises a head-mounted device arranged to provide display 110 such that display 110 is oriented within a pupil range of motion of a user. In some embodiments, AR device 102 may be at least a portion of another device that is arranged off of the user's head. In some embodiments, AR device 102 may detect the user's pupil or eye characteristics using a camera. In some embodiments, the camera may be configured with the characteristics of a pupilometer. In some embodiments, the pupil or eye characteristics may be determined based on a light sensor (e.g., light reflecting off an open eye may be different than light reflecting off a closed eye).

In some embodiments, the AR overlay may be modified based on the subject matter of media stream 106. For example, the AR overlay may comprise different advertisement, language, and brightness settings based on the language of the media stream, the genre of the media stream, and other parameters as determined by a source of the media stream. In other examples, the AR overlay may be modified based on a set of settings provided by the source of the media stream to encourage additional user interactions (e.g., pushing more content from the source of the media stream). In some embodiments, the AR overlay may be modified in response to a cognitive load analysis or a user interest analysis. For example, particular genres of content available via media stream 106 may fatigue a user's eyes faster than others (e.g., high resolution and high frame rate sequences with a lot of eye stimulation). In response to detecting a user is viewing subject matter beyond a cognitive load threshold or is reducing eye activity due to a lack of interest, the AR overlay may be modified to enable the user to continue engaging the AR device. The cognitive load threshold may be a combination of various parameters such as brightness magnitude and resolution setting as compared to a length of time before eye fatigue sets in. One skilled in the art would recognize other parameters may be used to identify a cognitive load threshold in order to activate an AR overlay display. In some embodiments, the cognitive load threshold may be used in combination with a baseline eye parameter setting wherein a user provides information indicative of symptoms of an eye condition. The AR overlay may have predefined settings based on the eye condition.

In some embodiments, AR device 102 and/or a system corresponding to AR device 102 may be configured to detect a distance between AR device 102 and remote device 104. Alternatively, AR device 102, if not directly secured to the user, may be configured to detect a distance from the user to at least one of AR device 102 and remote device 104. For example, if the user is determined to be close to AR device 102 but far from remote device 104 (or device 104 is not within field of view 108), the AR overlay may not display an overlay corresponding to an enhanced view of media stream 106 (e.g., no subtitles or captions may be displayed because the user cannot read the captions and view a smaller version of a display corresponding to remote device 104). In some embodiments, the distance a user is from a media stream source, a remote device, and/or an AR display may be determined based on metadata. In some embodiments, the metadata includes authorization requirements (e.g., maturity ratings and subscription status) which may be used to enable access to a particular media stream.

In some embodiments, if the user is far away (e.g., more than 10 feet away) from remove device 104 or remote device 104 is not within field of view 108, the AR overlay may be configured to provide a mirror stream of media stream 106 on at least a portion of display 110. In some embodiments, there may be a plurality of remote devices within a threshold distance of the user and/or AR device 102. Display 110 may be configured to generate options or switch mirrored streams based on which of the plurality of remote devices is within field of view 108 (e.g., different streams and options thereby may be displayed as a user changes from looking at a first remote device to looking at a second remote device). In some embodiments, fonts corresponding to UI elements 112 and/or the AR overlay may be modified based on a distance between the user and at least one of AR device 102 and remote device 104.

In some embodiments, AR device 102 may determine there is at least one object between the user of AR device 102 and remote device 104. In response to determining there is at least one object, AR device 102 may modify the portion of the AR overlay obstructed by the object such that a portion of the overlay is not generated for display on display 110. For example, if a user enabled captions or subtitles on display 110 corresponding to media stream 106, a portion of the subtitles may not be displayed if an object (e.g., a person) is obstructing a portion of a display of remote device 104 corresponding to the portion of the overlay wherein the portion of the caption may otherwise be displayed. In some embodiments, there may be a plurality of remote devices within field of view 108. For each of the media streams available on each of the plurality of remote devices, a caption score may be generated based on a user's profile (e.g., the captions of the media stream a user is most likely to be interested in, or correspond to a media stream that the user has provided an input that they would like to subscribe to the media stream, will be displayed).

In some embodiments, the system associated with AR device 102 may be configured to detect and recognize virtual watermarks (e.g., a non-visible QR code) may be accessible when detecting available media streams. The virtual watermarks, or watermarks, may be configured such that when detected particular ads are available for insertion or AR overlay settings are modified (e.g., to accommodate a media stream and an advertisement). In some embodiments, the watermarks may be personalized based on profile or AR device activity. For example, the watermarks may be generated by a creation and insertion service configured to accommodate user profile preferences (e.g., font sizes and language settings). In some embodiments, a plurality of remote devices in a particular area may be configured to provide these watermarks to AR device 102 when AR device 102 is within a threshold distance of each of the remote devices (e.g., there are a plurality of screens in an airport terminal and user can see a plurality of remote devices). In some embodiments, the watermark may be AR device-based and may be configured to enable automatic translations (e.g., a user may configure AR device 102 to translate any captions received to a preferred language or may be configured to only detect media streams available in the preferred language).

Within field of view 108, any of elements 114, 116, 118, and 120 may be generated as part of an AR overlay visible on display 110 of AR device 102. As shown in FIG. 1, element 114 may comprise identifying information regarding media stream 106, such as a title and/or serial programming information (e.g., a show title, a season, an episode, and a current playback progress point). Element 116, as shown, corresponds to an option to control playback of media stream 106 on remote device 104 using controls generated on display 110 of AR device 102. Element 118, as shown, corresponds to an option to modify media stream 106, particularly based on an overlay generated on display 110 of AR device 102. Element 120, as shown, corresponds to an option to modify display 110 of AR device 102, including an AR overlay generated on display 110 of AR device 102.

For example, one option can be "Display Closed Caption." The data corresponding to the option may be retrieved by a server and synched with a playback service corresponding to the media stream being accessed so that the appropriate closed caption or subtitle content are displayed. Additional options may comprise "Add to Queue" to enable a user of AR device 102 to have a list of media streams to revisit and "Show me More like this" to activate a recommendation algorithm to generate suggested available streams based on the user's past activity history, wherein the activity history may either be profile or device based. Such options may be available for most media streams and content items available via the accessible media streams. A virtual water mark, or QR code, may be updated throughout the streaming session to offer other options that are unique to a portion of the session. Such portion can be an advertisement, and the updated QR code would allow the user to add a product shown in the ad to their queue. A queue can be a temporary list that allows user to store references to content on it. For example, adding the movie "Black Widow" to a queue would allow the user to select the movie later and play it via an available service that they're subscribed to (e.g., Disney+). The user's authentication is then handled as if they were accessing the content directly from the service. The queue can also track the source of the content (e.g., when the content was added to the queue) in order to create appropriate deep links or the queue may be populated based on a consolidation of public sources and content catalogues to present options to the user to select from or filter these options down based on services that the user regularly accesses. Selecting a content item in the queue may enable the AR smart glass to act as a remote control and to direct the request to nearby media device (e.g., Smart TV) to automatically launch and play the content.

The AR overlay generated on display 110 of AR device 102 may be modified depending on which of elements 114, 116, 118, and 120 are selected. For example, if either of elements 118 or 120 is selected (e.g., based on a change in a pupil characteristic), AR overlay portion 122 may be generated on at least a portion of display 110 of AR device 102. AR overlay portion 122 comprises mirror stream 124, which corresponds to smaller version of media stream 106 as displayed on remote device 104. In some embodiments, mirror stream 124 may be at least partially transparent so a user can still see media stream 106 as displayed on remote device 104 while maintaining visible awareness of their surroundings. Playback controls 126 correspond to controls for mirror stream 124. In some embodiments, playback controls 126 may be used to control playback of either mirror stream 124 on display 110 of AR device 102 or media stream 106 as displayed on remote device 104. Modification options 128, when selected, comprise options to modify mirror stream 124 and other aspects of AR overlay portion 122 in response to inputs. For example, modification options 128 may comprise an option to enable captions on at least one of mirror stream 124 and media stream 106, or may comprise options to modify various display settings of display 110 on AR device 102 (e.g., font size, brightness, and color). Additionally, element 118 may be utilized to modify a media stream accessed by AR device 102 such that the accessed media stream is changed at least on display 110 of AR device 102 based on other accessible streams (e.g., a user gains access to a content platform associated with media stream 106 and selects another content item to view either on AR device 102, remote device 104, or both). Element 118 may also be used to display other available streams not within field of view 108 (e.g., as shown in FIG. 2).

In another example, if element 116 is selected (e.g., based on a change in a pupil characteristic), AR overlay portion 130 may be generated on at least a portion of display 110 of AR device 102. AR overlay portion 130 comprises overlay modification option 132, which, when selected, comprises options to modify aspects of AR overlay portion 130 in response to inputs. For example, modification option 132 may comprise an option to enable captions on at least one of AR overlay portion 130 and media stream 106, or may comprise options to modify various display settings of display 110 on AR device 102 (e.g., font size, brightness, and color). In some embodiments, AR overlay portion 130 may be at least partially transparent so a user can still see media stream 106 as displayed on remote device 104 while also viewing overlay portion 130 (e.g., to ensure a user can view captions or subtitles on display 110 while also seeing the display of remote device 104 in order to watch media stream 106). Playback controls 134 correspond to controls of media stream 106. In some embodiments, playback controls 134 may be used to control playback of media stream 106 as displayed on remote device 104. Additionally, overlay portion 130 may enable a user of AR device 102 to implement parental controls on at least one of AR device 102, remote device 104, and media stream 106 or a content provider associated with media stream 106, such that objectionable content may be restricted from access via any of AR device 102, remote device 104, or a content provider associated with media stream 106. Overlay portion 130 may also be utilized to change media stream 106 to, for example, a media stream out of field of view 108 but within a threshold distance (e.g., within a same household) or may enable a user to change media stream 106 to another content item available via a content platform accessible through both remote device 104 and AR device 102.

FIG. 2 illustrates AR overlay modification scenario 200, in which AR device 102 detects remote device 202 displaying media stream 106 outside field of view 108 of AR device 102, and display 110 of AR device 102 is modified with UI elements 204, 206, and 208, in accordance with some embodiments of the disclosure. AR device 102 may be secured to a user's head and may be configured to display an AR overlay (e.g., an overlay comprising UI elements 204, 206, and 208). In some embodiments, AR device 102 may detect remote device 104 (e.g., based on a previous pairing or connection such as in FIG. 1). In response to determining remote device 104 does not have a currently available media stream, AR device 102 detects media stream 106 outside of field of view 108 of AR device 102. Media stream 106 may be outside field of view 108 as media stream 106 is being accessed on remote device 202 which comprises a display a user cannot see via field of view 108.

While the previous embodiment outlined discovering content using hidden watermarks, it is important to note that the smart glass can discover content through other means. For example, the smart glass might be subscribed to receive closed-caption or subtitle content while watching content on one media device at one location, and might roam to another location and be prompted to switch sessions based on the content being played on a second device at the second location. In another example, using an accelerometer on the smart glass, and after walking a distance that exceeds a threshold (e.g., predetermined number of steps or predetermined distance such as 500 feet), the smart AR glass can scan for new streaming devices (e.g., via Bluetooth) and prompt the user for permission to subscribe to a different content ID that is being streamed on a second device. This is especially useful in large facilities, such as an airport, where TV displays are readily available, and users wouldn't need to authenticate to watch the content or retrieve additional information about the content.

In response to detecting media stream 106, UI element 204 may be generated comprising information related to media stream 106. UI element 204 may be generated as at least a portion of an AR overlay that enables a user to view their surroundings through display 110 while also being provided with at least one interactive option such as UI element 204. The information displayed, as part of the AR overlay generated on display 110, may include media stream source information (not shown), as well as descriptive information related to media stream 106 (e.g., a title and serial programming information) in addition to selectable options (e.g., at least one of UI element 206 comprising a mirror of media stream 106 and UI element 208 comprising control and/or modification options for displays associated with media stream 106). The information may be retrieved based on metadata attained via a local connection between AR device 102 and remote device 202, based on metadata retrieved from remote device 202 by AR device 102 by a network to which both remote device 202 and AR device 102 are connected, or based on at least one of a virtual watermark for remote device 202 or media stream 106 (e.g., a virtual watermark comprising a non-visible version of information stored in a visible QR code).

After AR device 102 retrieves information, the information may be displayed, as part of the AR overlay generated on display 110. The information may include media stream source information (e.g., a content platform from which the media stream is accessible), as well as descriptive information related to media stream 106 (e.g., a title and serial programming information) in addition to selectable options. The selectable options may comprise at least an option to control or modify the remote device settings, an option to modify media stream 106, and/or an option to modify display 110 or an option to modify the display corresponding to remote device 202. In some embodiments, AR device 102 may detect remote device 202 or media stream 106 based on information available between the other devices via a local communication network, wherein the local communication network is generated by either AR device 102 or remote device 202. Additionally, AR device 102 may detect remote device 202 based on a mutual connection to a network in the area (e.g., both devices receive authorization to connect to a same router, a same wireless network, or receive authorization to communicate with each other via an application installed on both devices).

Field of view 108 may be defined by a user's pupil range of motion and/or the size of display 110. AR device 102 may be secured to a user's head and may be configured to display an AR overlay (e.g., an overlay comprising UI elements 204, 206, and/or 208). AR device 102 may request a user to perform a range of pupil motions (e.g., side to side and vertically) to determine the range of motion of a user's pupils with respect to display 110 of AR device 102. If a user is able to indicate at each edge of display 110 that the user can move their pupils to provide an input at each edge of display 110, then field of view 108 may be defined by the size of display 110 (e.g., as described in reference to FIG. 1). If a user is unable to indicate at each edge of display 110 that the user can move their pupils to each edge of display 110, then AR device 102 may reduce field of view 108 based on the responsive range of the user's pupils with respect to display 110. AR device 102 may also comprise an apparatus that is not directly mounted to a user's head. In this scenario, field of view 108 may be dependent on a camera corresponding to AR device 102 that is configured to capture video of surroundings behind AR device 102. For example, AR device 102 may comprise a tablet or smartphone configured to generate a live feed of video of an environment behind display 110 of AR device 102. Field of view 108 in this example would be defined by the size of the portion of the environment behind display 110 that the camera is capable of capturing.

In one embodiment, media stream discovery can be done through a smart glass (e.g., AR device 102) that requests to retrieve content that is being streamed on the same network (e.g., Wi-Fi) that it is connected to. For example, a local media monitor service tracks content currently being watched on IP devices (e.g., Apple TV, Roku TV, etc.) as well as a set-top box (e.g., a set-top box configured to receive and display cable or satellite television programming), curates a list, and transmits it to a requesting device. Such service can rely on analyzing traffic supplied by a router (e.g., deep packet inspecting, hereinafter "DPI"), or the media devices report basic metadata about the content being played to the service (e.g., periodically, such as at least once a month). Minimal information can be reported, such as the app being used (e.g., Netflix) and the title of the content being consumed. Such service would allow the smart glass to start watching content being watched by others (e.g., in a different room) by accessing the stream as it is being displayed to an original streamer or even launching a separate independent stream (e.g., a user might want to watch a movie from the beginning available through an on-demand interface that was started by the original streamer). Since home gateways might not have information about the channel that a cable box is tuned to (e.g., a news channel such as CNBC), the media monitor service might collect samples of the streamed program's audio source for real-time analysis. Such samples can be collected via smart speakers in the vicinity of the cable box. Just as Shazam identifies content based on a fingerprint, similar techniques can be used to identify a channel or a show that a cable box (e.g., the set-top box) is tuned to. In fact, ShazamKit allows developers to create custom audio signatures for different types of content that they would want their app to recognize (e.g., podcasts) so such data can be used if and when such data is made available (e.g., as part of the virtual watermark). Similarly, a screen capture can be shared with the media monitor service for a channel logo detection. As a result, the original streamer can provide to potential other streamers what the original streamer is watching on that channel since the channel source and the current progress time through the programming would be known once the information is shared.

In some embodiments, AR device 102 may detect remote device 104, remote device 202, or media stream 106 based on information available between the other devices via a local communication network, wherein the local communication network is generated by either AR device 102, remote device 202, or remote device 104. In some embodiments, a plurality of users may have access to a particular iteration of AR device 102. Each of the plurality of users may have a particular user profile, wherein each user may have particular display settings, device control settings, and media stream detection settings. Regarding display settings, each user may have different language, brightness, font size, UI element arrangement, and caption settings. Regarding device control settings, each user may have a preference to control AR device 102 display 110 in order to modify the AR overlay or may have a preference to automatically control a display corresponding to remote device 202. Regarding media stream detection settings, each user may have access or subscriptions to different media guidance applications and/or media content sources. Additionally, each user may have preferences for different maturity ratings available to each user (e.g., as described in reference to FIG. 1).

In some embodiments, display 110 generates an AR overlay comprising any or all of UI elements 204, 206, and 208, which may be arranged in a menu or grid of selectable options. In some embodiments, the AR overlay structure is altered based on the available media stream sources the user profile active on AR device 102 has authorization to access (e.g., different interfaces corresponding to different content platforms providing different content streams). The AR overlay comprises at least one UI element generated for display on display 110 of AR device 102. The AR overlay may be partially transparent to enable a user of AR device 102 to see the environment behind the AR overlay, may only cover a portion of display 110 of AR device 102, or a combination thereof. In some embodiments, the UI element on the overlay is selectable using a cursor, similar to a cursor as used on a personal computer screen. In some embodiments, the UI element may be responsive to audio input (e.g., a user providing an audible command).

The overlay and UI elements comprising the overlay may be responsive to changes in a user's pupils or the movement of the user's pupils. In some embodiments, the AR overlay may be configured to enable a user to access or subscribe to either a content source or a media stream based on at least one of a user's eye or pupil movements and/or a change in a user's pupil characteristics (e.g., pupil size and blinking rate). In some embodiments, the AR device may be configured to provide a user with an option to join a group stream, wherein each member of the group stream may be able to share comments while viewing the same portion of a media stream. In some embodiments, the AR overlay may be configured to enable a user to take screen grabs of the media stream, or modify the media stream (e.g., creating a locally stored modified copy such as a music stream with a chorus removed). In some embodiments, the AR overlay may comprise parental control settings and notifications (e.g., a parent profile may be utilized to set available maturity ratings for their children's AR device profiles and may be notified of their children accessing unauthorized or questionable content, thereby providing the user with a restriction of content option). The parental controls may be enabled on the AR device profiles or any device that may be configured to access the AR device profiles.

In some embodiments, AR device 102 comprises a smart glass device. In some embodiments, AR device 102 comprises a head-mounted device arranged to provide display 110 such that display 110 is oriented within a pupil range of motion of a user. In some embodiments, AR device 102 may be at least a portion of another device that is arranged off of the user's head. In some embodiments, AR device 102 may detect the user's pupil or eye characteristics using a camera. In some embodiments, the camera may be configured with the characteristics of a pupilometer. In some embodiments, the pupil or eye characteristics may be determined based on a light sensor (e.g., light reflecting off an open eye may be different than light reflecting off a closed eye).

In some embodiments, the AR overlay may be modified based on the subject matter of media stream 106. For example, the AR overlay may comprise different advertisement, language, and brightness settings based on the language of the media stream, the genre of the media stream, and other parameters as determined by a source of the media stream. In other examples, the AR overlay may be modified based on a set of settings providing by the source of the media stream to encourage additional user interactions (e.g., pushing more content from the source of the media stream). In some embodiments, the AR overlay may be modified in response to a cognitive load analysis or a user interest analysis. For example, particular genres of content available via media stream 106 may fatigue a user's eyes faster than others (e.g., high resolution and high frame rate sequences with a lot of eye stimulation). In response to detecting a user is viewing subject matter beyond a cognitive load threshold or is reducing eye activity due to a lack of interest, the AR overlay may be modified to enable the user to continue engaging the AR device. The cognitive load threshold may be a combination of various parameters such as brightness magnitude and resolution setting as compared to a length of time before eye fatigue sets in. One skilled in the art would recognize other parameters may be used to identify a cognitive load threshold in order to activate an AR overlay display. In some embodiments, the cognitive load threshold may be used in combination with a baseline eye parameter setting wherein a user provides information indicative of symptoms of an eye condition. The AR overlay may have predefined settings based on the eye condition.

Within field of view 108, any of elements 204, 206, 210, 212, and 214 may be generated as part of an AR overlay visible on display 110 of AR device 102. As shown in FIG. 2, element 204 may comprise identifying information regarding media stream 106, such as a title and/or serial programming information (e.g., a show title, a season, an episode, and a current playback progress point). Element 206, as shown, comprises a mirror stream of media stream 106 reduced to a size viewable on an overlay generated for display on display 110. Element 210, as shown, corresponds to an option to control playback of media stream 106 on remote device 202 using controls generated on display 110 of AR device 102. Element 212, as shown, corresponds to an option to modify media stream 106, particularly based on an overlay generated on display 110 of AR device 102. Element 214, as shown, corresponds to an option to modify display 110 of AR device 102, including an AR overlay generated on display 110 of AR device 102.

The AR overlay generated on display 110 of AR device 102 may be modified depending on which of elements 206, 210, 212, and 214 are selected. For example, if any of elements 206, 212, or 214 are selected (e.g., based on a change in a pupil characteristic), AR overlay portion 216 may be generated on at least a portion of display 110 of AR device 102. As described in reference to FIG. 1, AR overlay portion 216 may vary in transparency or opaqueness based on user settings. Considering AR overlay portion 216 is generated on display 110 without a remote device display within field of view 108, AR overlay portion 216 may comprise an initially opaque set of icons which may be adjusted to be more transparent based on a user preference. AR overlay portion 216 comprises mirror stream 206, which corresponds to smaller version of media stream 106 as displayed on remote device 202. In some embodiments, mirror stream 206 may be at least partially transparent so a user can still the environment behind display 110 of AR device 102. Playback controls 126 correspond to controls for mirror stream 206. In some embodiments, playback controls 126 may be used to control playback of either mirror stream 206 on display 110 of AR device 102 or media stream 106 as displayed on remote device 202. Modification options 128, when selected, comprise options to modify mirror stream 206 and other aspects of AR overlay portion 216 in response to inputs. For example, modification options 128 may comprise an option to enable captions on at least one of mirror stream 206 and media stream 106, or may comprise options to modify various display settings of display 110 on AR device 102 (e.g., font size, brightness, and color). Additionally, element 212 may be utilized to modify a media stream accessed by AR device 102 such that the accessed media stream is changed at least on display 110 of AR device 102 based on other accessible streams (e.g., a user gains access to a content platform associated with media stream 106 and selects another content item to view either on AR device 102, remote device 202, or both).

In another example, if element 210 is selected (e.g., based on a change in a pupil characteristic), AR overlay portion 218 may be generated on at least a portion of display 110 of AR device 102. AR overlay portion 218 comprises overlay modification options 220, which, when selected, comprise options to modify aspects of AR overlay portion 218 in response to inputs. Modification options 220 comprise change stream element 222, modify platform access element 224, block stream element 226, and playback control 134. Change stream element 222, when selected, enables a user of AR device 102 to change media stream 106 (e.g., if the media stream comprises content that a user of remote device 202 should not be watching in the opinion of the user of AR device 102, the user of AR device 102 can select an alternative stream to replace media stream 106, which may be accessible via a content platform providing media stream 106). Modify platform access element 224 may enable a user of AR device 102 to block access to a source of media stream 106 (e.g., the user of AR device 102 may determine there is not useful or suitable content to stream via remote device 202 and may block access to a source of media stream 106 at either or both of AR device 102 and remote device 202). Block stream element 226 enables a user of AR device 102 to prevent further viewing of media stream 106, without impacting access to the source of media stream 106. The blocked setting may be applied to at least one of AR device 102, remote device 202, and a profile associated with either or both of AR device 102 and remote device 202. Playback controls 134 correspond to controls of media stream 106. In some embodiments, playback controls 134 may be used to control playback of media stream 106 as displayed on remote device 104 or 202.

In some embodiments, AR device 102 and/or a system corresponding to AR device 102 may be configured to detect a distance from AR device 102, remote device 104, and remote device 202. Alternatively, AR device 102, if not directly secured to the user, may be configured to detect a distance from the user to at least one of AR device 102, remote device 104, and remote device 202. For example, if the user is determined to be close to AR device 102 but far from remote device 202, the AR overlay may not display an overlay corresponding to an enhanced view of media stream 106 (e.g., no subtitles or captions may be displayed because the user cannot read the captions and view a small version of a display corresponding to remote device 202). In some embodiments, the distance a user is from a media stream source, a remote device, and/or an AR display may be determined based on metadata. In some embodiments, the metadata includes authorization requirements (e.g., maturity ratings and subscription status) which may be used to enable access to a particular media stream.

In some embodiments, if the user is far away (e.g., more than 10 feet away) from remove device 202, the AR overlay may be configured to provide a mirror stream of media stream 106 on at least a portion of display 110. In some embodiments, there may be a plurality of remote devices within a threshold distance of the user and/or AR device 102. Display 110 may be configured to generate options or switch mirrored streams based on which of the plurality of remote devices is within field of view 108 (e.g., different streams and options thereby may be displayed as a user changes from looking at a first remote device and starts looking at a second remote device). In some embodiments, fonts corresponding to UI elements generated on the AR overlay may be modified based on a distance between the user and at least one of AR device 102 and remote device 202. In some embodiments, there may be a plurality of remote devices within field of view 108. For each of the media streams available on each of the plurality of remote devices, a caption score may be generated based on a user's profile (e.g., the captions of the media stream a user is most likely to be interested in, or that correspond to a media stream that the user has provided an input indicating that they would like to subscribe to, will be displayed).

In some embodiments, the system associated with AR device 102 may be configured to detect and recognize virtual watermarks (e.g., a QR code may be accessible when detecting available media streams. The virtual watermarks, or watermarks, may be configured such that, when detected, particular ads are available for insertion or AR overlay settings are modified (e.g., to accommodate a media stream and an advertisement). In some embodiments, the watermarks may be personalized based on profile or AR device activity. For example, the watermarks may be generated by a creation and insertion service configured to accommodate user profile preferences (e.g., font sizes and language settings). In some embodiments, a plurality of remote devices in a particular area may be configured to provide these watermarks to AR device 102 when AR device 102 is within a threshold distance of each of the remote devices (e.g., there are a plurality of screens in an airport terminal and user can see a plurality of remote devices). In some embodiments, the watermark may be AR device based and may be configured to enable automatic translations (e.g., a user may configure AR device 102 to translate any captions received to a preferred language or to only detect media streams available in the preferred language).

Figure 3:
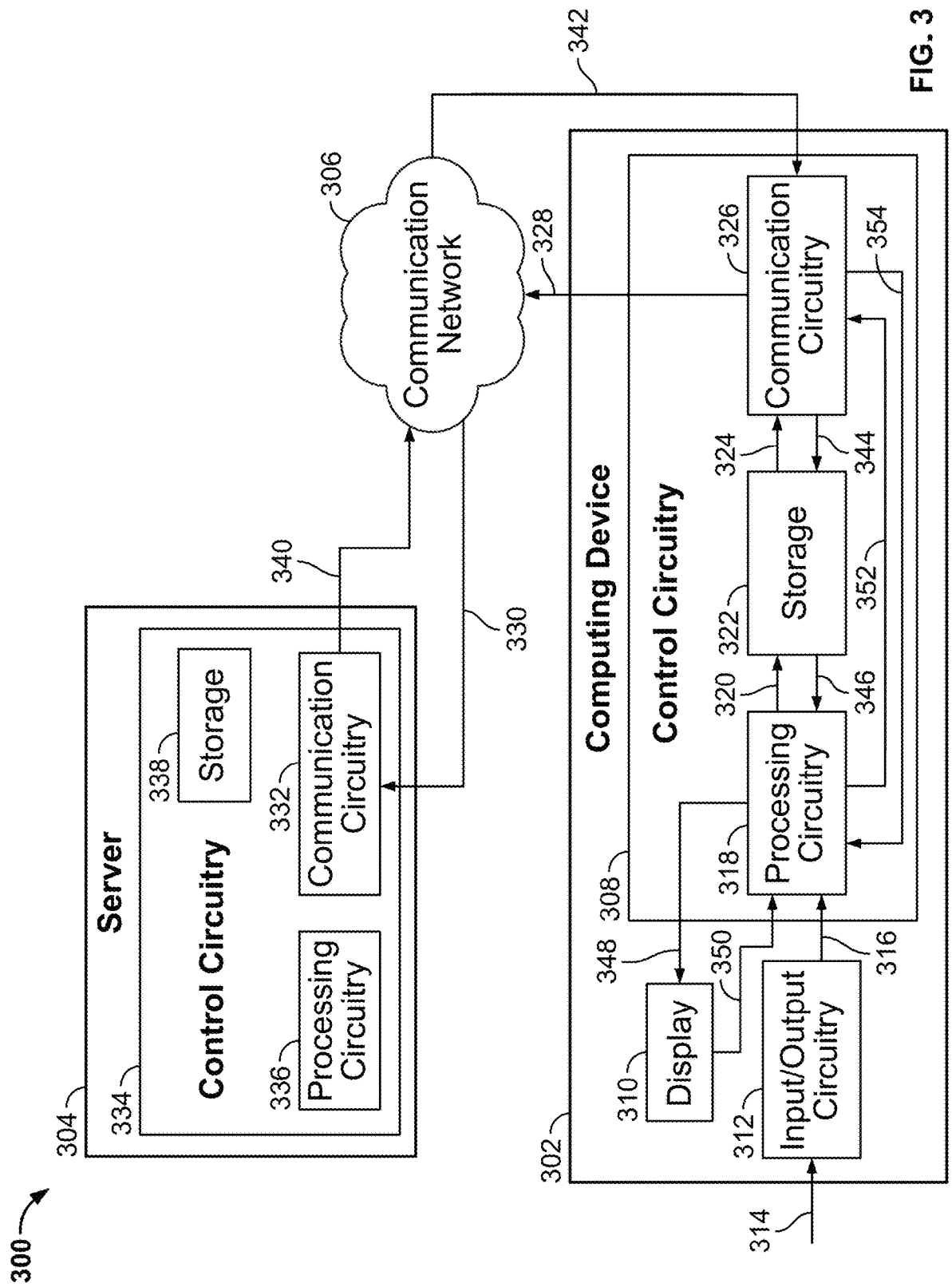
FIG. 3 is a block diagram of a system configured to generate an AR overlay on the display of an AR device in response to detecting a media stream, in accordance with some embodiments of the disclosure.

FIG. 3 is a block diagram of illustrative AR overlay modification system 300, which is configured to generate an AR overlay on display 310 of an AR device (e.g., computing device 302) in response to detecting a media stream, in accordance with some embodiments of the disclosure. In some embodiments, one or more parts of or the entirety of the interactive system may be configured as a system implementing various features, processes, and components of FIGS. 1, 2, and 4-11B. Although FIG. 3 shows a certain number of components, in various examples, the interactive system may include fewer than the illustrated number of components and/or multiples of one or more of the illustrated number of components (e.g., multiple iterations of computing device 302 for each device in the system with a display and or multiple iterations of server 304).

The interactive system is shown to include computing device 300, content server 302, and a communication network 306. It is understood that while a single instance of a component may be shown and described relative to FIG. 3, additional instances of the component may be employed. For example, content server 302 may include, or may be incorporated in, more than one server. Similarly, communication network 306 may include, or may be incorporated in, more than one communication network. Content server 302 is shown communicatively coupled to computing device 300 through communication network 306. While not shown in FIG. 3, content server 302 may be directly communicatively coupled to computing device 300, for example, in a system absent or bypassing communication network 306.

Communication network 306 may comprise one or more network systems, such as, without limitation, Internet, LAN, WIFI or other network systems suitable for audio processing applications. In some embodiments, the system of FIG. 3 excludes content server 302, and functionality that would otherwise be implemented by content server 302 is instead implemented by other components of the system depicted by FIG. 3, such as one or more components of communication network 306. In still other embodiments, content server 302 may work in conjunction with one or more components of communication network 306 to implement certain functionality described herein in a distributed or cooperative manner. Similarly, in some embodiments, the system depicted by FIG. 3 excludes computing device 300, and functionality that would otherwise be implemented by computing device 300 is instead implemented by other components of the system depicted by FIG. 3, such as one or more components of communication network 306 or content server 302 or a combination of the same. In other embodiments, computing device 300 works in conjunction with one or more components of communication network 306 or content server 302 to implement certain functionality described herein in a distributed or cooperative manner.

Computing device 300 includes control circuitry 308, display circuitry 310 and input/output circuitry 312. Control circuitry 308 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 308 in turn includes transceiver circuitry 314, storage 316 and processing circuitry 318. In some embodiments, computing device 300 or control circuitry 308 may be configured as varying embodiments of audio/video user entertainment system 100 of FIG. 1.

In addition to control circuitry 308 and 320, computing device 300, content server 302, may each include storage (storage 316 and storage 322, respectively). Each of storages 316 and 322 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 316 and 322 may be used to store various types of content, metadata, and/or other types of data (e.g., they can be used to record audio questions asked by one or more participants connected to a conference). Non-volatile memory may also be used (e.g., to launch a boot-up routine and other instructions). Cloud-based storage may be used to supplement storages 316 and 322 or instead of storages 316 and 322. In some embodiments, the user profile activity history, user profile preferences, and accessible media content may be stored in one or more of storages 316 and 322.

In some embodiments, control circuitry 320 and/or 308 executes instructions for an application stored in memory (e.g., storage 322 and/or storage 316). Specifically, control circuitry 320 and/or 308 may be instructed by the application to perform the functions discussed herein. In some implementations, any action performed by control circuitry 320 and/or 308 may be based on instructions received from the application. For example, the application may be implemented as software or a set of executable instructions that may be stored in storage 322 and/or 316 and executed by control circuitry 320 and/or 308. In some embodiments, the application may be a client/server application where only a client application resides on computing device 300, and a server application resides on content server 302.

The application may be implemented using any suitable architecture. For example, it may be a stand-alone application wholly implemented on computing device 300. In such an approach, instructions for the application are stored locally (e.g., in storage 316), and data for use by the application is downloaded on a periodic basis (e.g., from an out-of-band feed, from an Internet resource, or using another suitable approach). Control circuitry 308 may retrieve instructions for the application from storage 316 and process the instructions to perform the functionality described herein. Based on the processed instructions, control circuitry 308 may determine to execute elements of the embodiments of this disclosure in response to input received from input/output circuitry 312 or from communication network 306. For example, in response to a user providing inputs to activate entertainment system 100, control circuitry 308 may perform the steps of any of the processes depicted in FIGS. 1, 2, and 4-11B, or processes relative to various embodiments.

In client/server-based embodiments, control circuitry 308 may include communication circuitry suitable for communicating with an application server (e.g., content server 302) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 306). In another example of a client/server-based application, control circuitry 308 runs a web browser that interprets web pages provided by a remote server (e.g., content server 302). For example, the remote server may store the instructions for the application in a storage device. The remote server may process the stored instructions using circuitry (e.g., control circuitry 308) and/or generate displays. Computing device 300 may receive the displays generated by the remote server and may display the content of the displays locally via display circuitry 310. This way, the processing of the instructions is performed remotely (e.g., by content server 302) while the resulting displays, such as the display windows described elsewhere herein, are provided locally on computing device 300. Computing device 300 may receive inputs from the user via input/output circuitry 312 and transmit those inputs to the remote server for processing and generating the corresponding displays. Alternatively, computing device 300 may receive inputs from the user via input/output circuitry 312 and process and display the received inputs locally, by control circuitry 308 and display circuitry 310, respectively.

Content server 302 and computing device 300 may transmit and receive content and data such as media content via communication network 306. For example, content server 302 may be a media content provider, and computing device 300 may be a smart television configured to download or stream media content, such as a live news broadcast, from content server 302. Control circuitry 320, 308 may send and receive commands, requests, and other suitable data through communication network 306 using transceiver circuitry 342, 314, respectively. Control circuitry 320, 308 may communicate directly with each other using transceiver circuitry 342, 314, respectively, avoiding communication network 306.

It is understood that computing device 300 is not limited to the embodiments and methods shown and described herein. In nonlimiting examples, computing device 300 may be a television, a Smart TV, a set-top box, an integrated receiver decoder (TRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably displaying and manipulating media content.

Control circuitry 320 and/or 308 may be based on any suitable processing circuitry such as processing circuitry 328 and/or 318, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 320 and/or control circuitry 308 are configured to implement a media content operation system, such as systems, or parts thereof, that perform various processes described and shown in connection with FIGS. 1, 2, and 4-11B, and/or systems carrying out the features described and shown relative to FIGS. 1, 2, and 4-11B.

Computing device 300 receives user input 332 at input/output circuitry 312. For example, computing device 300 may receive a user input such as a user swipe or user touch, as previously discussed. In some embodiments, computing device 300 is a media device (or player) configured as entertainment system 100, with the capability to access media content. It is understood that computing device 300 is not limited to the embodiments and methods shown and described herein. In nonlimiting examples, computing device 300 may be a television, a Smart TV, a set-top box, an integrated receiver decoder (TRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 332 may be received from a user selection-capturing interface that is separate from device 300, such as a remote-control device, trackpad or any other suitable user movement sensitive or capture devices, or as part of device 302, such as a touchscreen of display circuitry 310. Transmission of user input 332 to computing device 300 may be accomplished using a wired connection, such as an audio cable, USB cable, ethernet cable or the like attached to a corresponding input port at a local device, or may be accomplished using a wireless connection, such as Bluetooth, WiFi, WiMAX, GSM, UTMS, CDMA, TDMA, 3G, 4G, 4G LTE, 5G, or any other suitable wireless transmission protocol. Input/output circuitry 312 may comprise a physical input port such as a 3.5 mm audio jack, RCA audio jack, USB port, ethernet port, or any other suitable connection for receiving audio over a wired connection, or may comprise a wireless receiver configured to receive data via Bluetooth, WiFi, WiMAX, GSM, UTMS, CDMA, TDMA, 3G, 4G, 4G LTE, 5G, or other wireless transmission protocols.

Processing circuitry 318 may receive user input 332 from input/output circuitry 312 using communication path 334. Processing circuitry 318 may convert or translate the received user input 332 which may be in the form of gestures or movement, to digital signals. In some embodiments, input/output circuitry 312 performs the translation to digital signals. In some embodiments, processing circuitry 318 (or processing circuitry 328, as the case may be) carries out disclosed processes and methods. For example, processing circuitry 318 or processing circuitry 328 may perform processes of FIGS. 1, 2, and 4-11B, respectively.

Processing circuitry 318 may provide requests to storage 316 by communication path 336. Storage 316 may provide requested information to processing circuitry 318 by communication path 338. Storage 316 may transfer, by communication path 338, a request for information to transceiver circuitry 314, which may translate or encode the request for information to a format receivable by communication network 306 before transferring the request for information by communication path 340. Communication network 306 may forward the translated or encoded request for information to transceiver circuitry 342 by communication path 346.

At transceiver circuitry 342, the translated or encoded request for information, received through communication path 346, is translated or decoded for processing circuitry 328, which will provide a response to the request for information (e.g., additional activities associated with an event) based on information available through control circuitry 320 or storage 322, or a combination thereof. The response to the request for information is then provided back to communication network 306 by communication path 350 in an encoded or translated format such that communication network 306, which can forward the encoded or translated response back to transceiver circuitry 314 by communication path 352.

At transceiver circuitry 314, the encoded or translated response to the request for information may be provided directly back to processing circuitry 318 by communication path 356, or may be provided to storage 316, through communication path 358, which then provides the information to processing circuitry 318 by communication path 360. Processing circuitry 318 may also provide a request for information directly to transceiver circuitry 314 though communication path 362, enabling storage 316 to respond to an information request, provided through communication 336, by communication path 360 that storage 316 does not contain information pertaining to the request from processing circuitry 318.

Processing circuitry 318 may process the response to the request received through communication path 356 or 360 and may provide instructions to display circuitry 310 for a notification to be provided to the users through communication path 364. Display circuitry 310 may incorporate a timer for providing the notification or may rely on inputs through input/output circuitry 312 from the user, which are forwarded through processing circuitry 318 through communication path 364, to determine how long or in what format to provide the notification. When display circuitry 310 determines the display has been completed (e.g., media content has completed a playback time or a user has exited out of a recommendation), a notification may be provided to processing circuitry 310 through communication path 366.

The communication paths provided in FIG. 3 between computing device 300, content server 302, communication network 306, and all subcomponents depicted are exemplary and may be modified to reduce processing time or enhance processing capabilities for each step in the processes disclosed herein by one skilled in the art.

Figure 4:
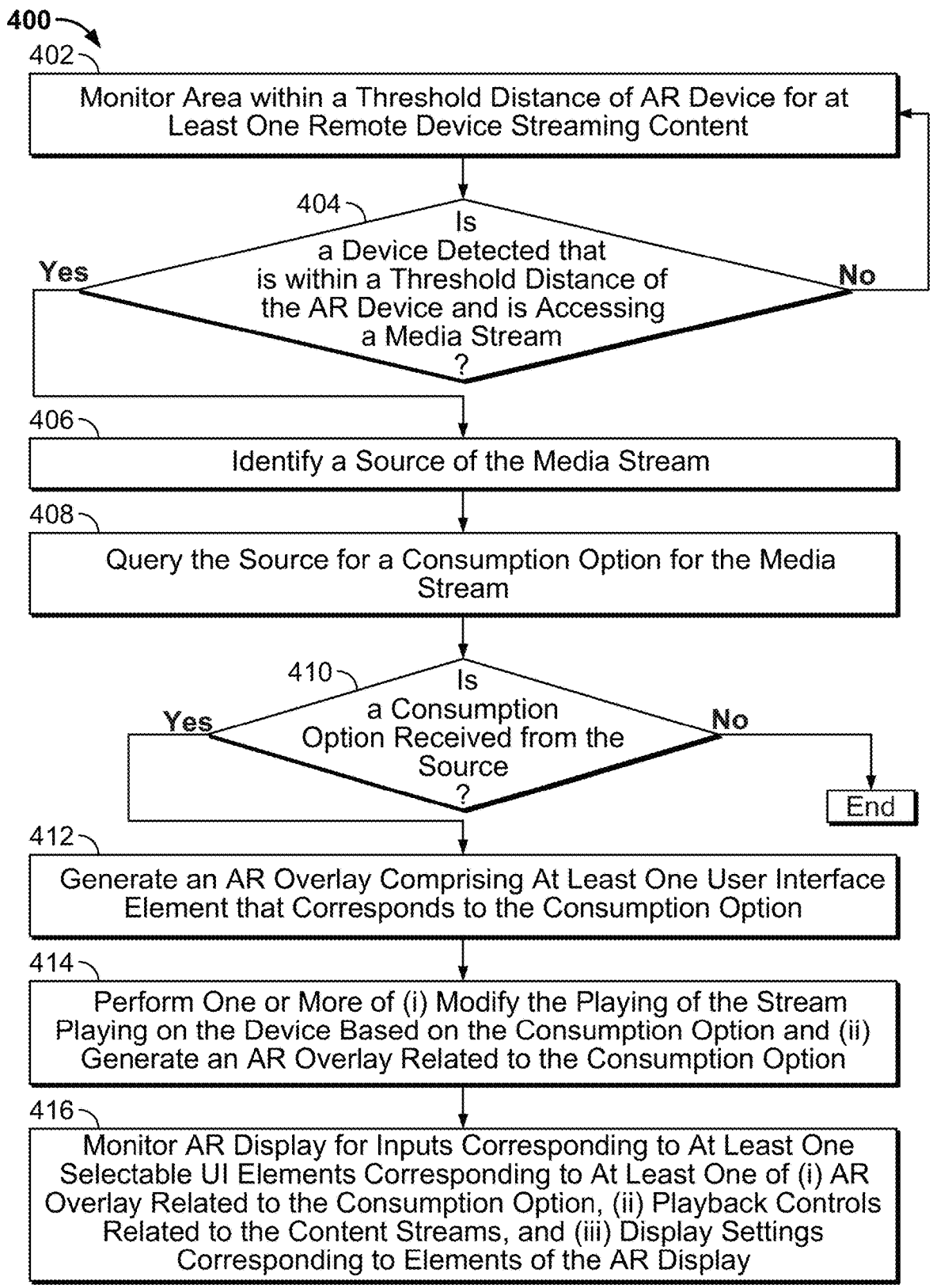
FIG. 4 is a flowchart representing an illustrative process for generating an AR overlay comprising at least one UI element corresponding to a consumption option, in accordance with some embodiments of the disclosure.

FIG. 4 is a flowchart representing AR overlay generation process 400 for generating an AR overlay comprising at least one UI element corresponding to a consumption option, in accordance with some embodiments of the disclosure. Process 400 may be executed by any or all of the components depicted in FIGS. 1-3 and 8-11B or described in reference to FIGS. 1-3 and 8-11B. Process 400 may comprise all of or fewer of the steps described herein, including exemplary alternative embodiments described herein. Additionally, process 400 may be incorporated into or may incorporate elements of either process 500 of FIG. 5 or process 600 of FIG. 6.

At 402, an area within a threshold distance of an AR device is monitored for at least one remote device that is streaming content (e.g., as described in reference to FIGS. 1 and 2, such as an area comprising a household with portions within 15 feet of the AR device). If it is determined that there is a device detected that is within the threshold distance of the AR device comprises that is currently accessing a media stream (YES at 404), a source of the media stream is identified at 406. For example, the AR device may detect a content server corresponding to the media stream and may transmit a request for interactive options generated by a content provider associated with the content stream (e.g., interactive options corresponding to metadata associated with the content stream as defined by a virtual watermark associated with the content stream as described in reference to FIGS. 1 and 2). If it is determined there is not a device within the threshold distance of the AR device comprises that is accessing a media stream (NO at 404), then the area within the threshold distance of the AR device is monitored for at least one remote device that is streaming content at 402.

At 408, the identified source of the media stream is queried for a consumption option for the media stream (e.g., a consumption option comprising playback controls at the AR device or the remote device). If a consumption option is not received from the source (NO at 410), then the process ends, and the user of the AR device may restart the process at process block 402. If a consumption option is received from the source (YES at 410), an AR overlay comprising at least one user interface element that corresponds to the consumption option is generated at 412. For example, the overlay may be generated on display 110 of FIGS. 1 and 2 or display 310 of FIG. 3. The overlay may comprise any of the elements depicted in or described in reference to FIGS. 1, 2, and 8-11B. At 414, one or more of (i) modifying the playing of the stream playing on the other device based on the consumption option and (ii) generating an AR overlay related to the consumption option is performed. Process block 410 may be executed in response to a user input, as described in reference to FIGS. 1 and 2, or may be executed automatically in response to generating the overlay. At 416, the AR display is monitored for inputs corresponding to at least one selectable UI elements corresponding to at least one of (i) AR overlay related to the consumption option, (ii) playback controls related to the content streams, and (iii) display settings corresponding to elements of the AR display. The inputs may comprise any of the inputs described in reference to FIGS. 1-3 and 5-11B (e.g., pupil based, string of character based, or audio).

Figure 5:
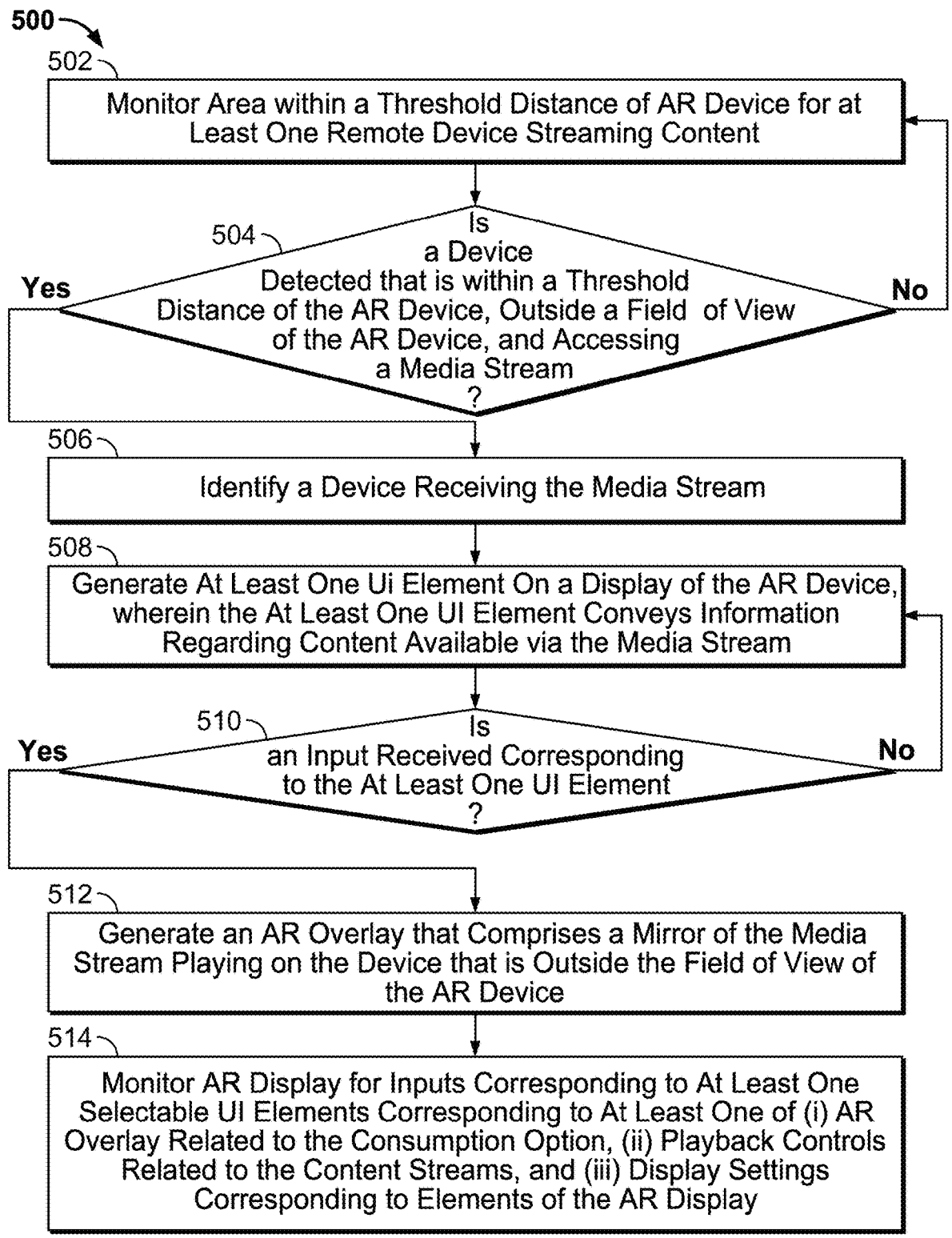
FIG. 5 is a flowchart representing an illustrative process for generating an AR overlay comprising a mirror of a media stream playing on a device outside a field of view of an AR device that generates the AR overlay, in accordance with some embodiments of the disclosure.

FIG. 5 is a flowchart representing AR overlay generation process 500 for generating an AR overlay comprising a mirror of a media stream playing on a device outside a field of view of an AR device that generates the AR overlay, in accordance with some embodiments of the disclosure. Process 500 may be executed by any or all of the components depicted in FIGS. 1-3 and 8-11B or described in reference to FIGS. 1-3 and 8-11B. Process 500 may comprise all of or fewer of the steps described herein, including exemplary alternative embodiments described herein. Additionally, process 500 may be incorporated into or may incorporate elements of either process 400 of FIG. 4 or process 600 of FIG. 6.

At 502, an area within a threshold distance of an AR device is monitored for at least one remote device that is streaming content (e.g., as described in reference to FIGS. 1 and 2, such as an area comprising a household with portions within 15 feet of the AR device). If it is determined that there is a device detected that is within the threshold distance of the AR device comprises that is in the field of view of the AR device and currently accessing a media stream (YES at 504), a source of the media stream is identified at 506. For example, the AR device may detect a content server corresponding to the media stream and may transmit a request for interactive options generated by a content provider associated with the content stream (e.g., interactive options corresponding to metadata associated with the content stream as defined by a virtual watermark associated with the content stream as described in reference to FIGS. 1 and 2). If it is determined that there is not a device detected that is within the threshold distance of the AR device comprises that is in the field of view of the AR device and currently accessing a media stream (NO at 504), then the area within the threshold distance of the AR device is monitored for at least one remote device that is streaming content at 502.

At 506, at least one UI element is generated on a display of the AR device, wherein the at least one UI element conveys information regarding content available via the media stream (e.g., an interactive thumbnail that conveys descriptive information comprising characters and/or images characterizing the media stream). If an input is not received corresponding to the at least one UI element (NO at 510), then at least one UI element is generated on a display of the AR device at 506. If an input is received corresponding to the at least one UI element (YES at 510), an AR overlay comprising a mirror of the media stream playing on the other device that is outside the field of view of the AR device at 512. For example, the overlay may be generated on display 110 of FIGS. 1 and 2 or display 310 of FIG. 3. The overlay may comprise any of the elements depicted in or described in reference to FIGS. 1, 2, and 8-11B. At 514, the AR display is monitored for inputs corresponding to at least one selectable UI elements corresponding to at least one of (i) AR overlay related to the consumption option, (ii) playback controls related to the content streams, and (iii) display settings corresponding to elements of the AR display. The inputs may comprise any of the inputs described in reference to FIGS. 1-3 and 5-11B (e.g., pupil based, string of character based, or audio).

FIG. 6 is a flowchart representing AR overlay modification process 600, which identifies a media stream in order to modify an AR overlay, in accordance with some embodiments of the disclosure. Process 600 may be executed by any or all of the components depicted in FIGS. 1-3 and 8-11B or described in reference to FIGS. 1-3 and 8-11B. Process 600 may comprise all of or fewer of the steps described herein, including exemplary alternative embodiments described herein. Additionally, process 600 may be incorporated into or may incorporate elements of either process 400 of FIG. 4 or process 500 of FIG. 5.

At 602, an active user profile is identified on the AR device. The active user profile may be identified by login credentials or a unique QR code corresponding to an individual user's virtual watermark. If it is determined that there is not a device streaming content within a threshold distance (e.g., there is not a device detected within a room, within 15 feet, and or within a same household as the AR device) of the AR device (NO at 604), then the process ends. If it is determined that this is a device streaming content within a threshold distance (YES at 604), then the AR device user's field of view is used to determine whether the other device streaming content it visible at 606. In some embodiments, detecting the media stream playing on the other device that is within the threshold distance of the AR device comprises determining a first location of the AR device and determining a second location of a source of the media stream. A distance between the first location and the second location is determined and then compared to the threshold distance (e.g., the threshold distance is setting corresponding to the size of a household that has multiple devices accessible by the AR device). In some embodiments, a local communication network at the AR device is activated. A distance corresponding to at least one device responsive to the local communication network, based on a response corresponding to the at least one device, is determined.

If it is determined that the other device streaming content is within the field of view of the AR device user (YES at 606), then an AR overlay is generated corresponding to the streamed content at 608. For example, the AR overlay may comprise at least one of (i) a first portion corresponding to at least one selectable option to view at least a portion of content streaming on at least one device on a first portion of the AR device display, (ii) a second portion comprising at least one a selectable option to modify either the AR device display or at least one streaming device display, and (iii) a third option to take control of at least one streaming device. If it is determined that the other device streaming content is not within the field of view of the AR device user (NO at 606), then objects obstructing the AR device user's view of the other device streaming content are detected at 610. In some embodiment, the field of view may be defined by the AR device display (e.g., display 110 of FIGS. 1 and 2 or display 310 of FIG. 3). In some embodiments, the field of view may be defined by details available in the use profile. For example, the field of view may be less than the size of a display if a user has reduced fields of vision (e.g., poor peripheral vision) or some condition preventing viewing of a portion of the AR display (e.g., an eye is injured).

If it is determined that an object is not obstructing the AR device user's view of the other device streaming content (NO at 610), then an AR overlay is generated corresponding to the streamed content at 608. For example, the AR overlay may comprise at least one of (i) a first portion corresponding to at least one selectable option to view at least a portion of content streaming on at least one device on a first portion of the AR device display, (ii) a second portion comprising at least one a selectable option to modify either the AR device display or at least one streaming device display, and (iii) a third option to take control of at least one streaming device. If it is determined that an object is obstructing the AR device user's view of the other device streaming content (YES at 610), an AR device overlay is generated based on the streamed content and the user profile at 612 (e.g., captions are added in a user's preferred language). At 614, the AR device overlay is modified based on the obstruction (e.g., a portion of the captions may be blocked based on the position of the object relative to the display of the captions).

If there is not a second device streaming content within a threshold distance of the AR device (NO at 616), then an AR overlay is generated corresponding to the streamed content at 608. For example, the AR overlay may comprise at least one of (i) a first portion corresponding to at least one selectable option to view at least a portion of content streaming on at least one device on a first portion of the AR device display, (ii) a second portion comprising at least one a selectable option to modify either the AR device display or at least one streaming device display, and (iii) a third option to take control of at least one streaming device. Each of the portions described may be modified depending on the position of the obstruction or may be presented as an overlay in spite of the object to provide the user with AR device overlay display settings (e.g., provide options to generate the AR device overlay to be modified based on the obstruction or be generated as if the obstruction was not present). If there is a second device streaming content within a threshold distance of the AR device (YES at 616), then it is determined whether the second device streaming content is within the field of view of the AR device user at 618.

If it is determined the second device streaming content is not within the field of view of the AR device user (NO at 618), then an AR overlay is generated corresponding to the streamed content at 608. For example, the AR overlay may comprise at least one of (i) a first portion corresponding to at least one selectable option to view at least a portion of content streaming on at least one device on a first portion of the AR device display, (ii) a second portion comprising at least one a selectable option to modify either the AR device display or at least one streaming device display, and (iii) a third option to take control of at least one streaming device. If it is determined the second device streaming content is within the field of view of the AR device user (YES at 618), then an AR device overlay based on the content streaming on the second device and preferences found in the user profile is generated at 620. In some embodiments, a scoring metric is enabled when multiple devices streaming content are detected within a threshold distance and/or within a field of view of the user of the AR device. The stream with the highest score may be selected for generating the AR overlay (e.g., the captions of the stream with the highest score may be automatically generated as part of the AR overlay while the user has an option to change to the other stream captions). The highest score may be determined by at least one of a smallest distance from the user of the streaming device display, a user preference for subject matter of streamed content on the streaming device display, a user preference for language settings of the streamed content (e.g., as defined by a virtual watermark), and/or other user preference data as collected by content platforms which are linked to the user profile on the AR device (e.g., viewing histories of particular content types, genres, serial programming, etc.).

Figure 7:
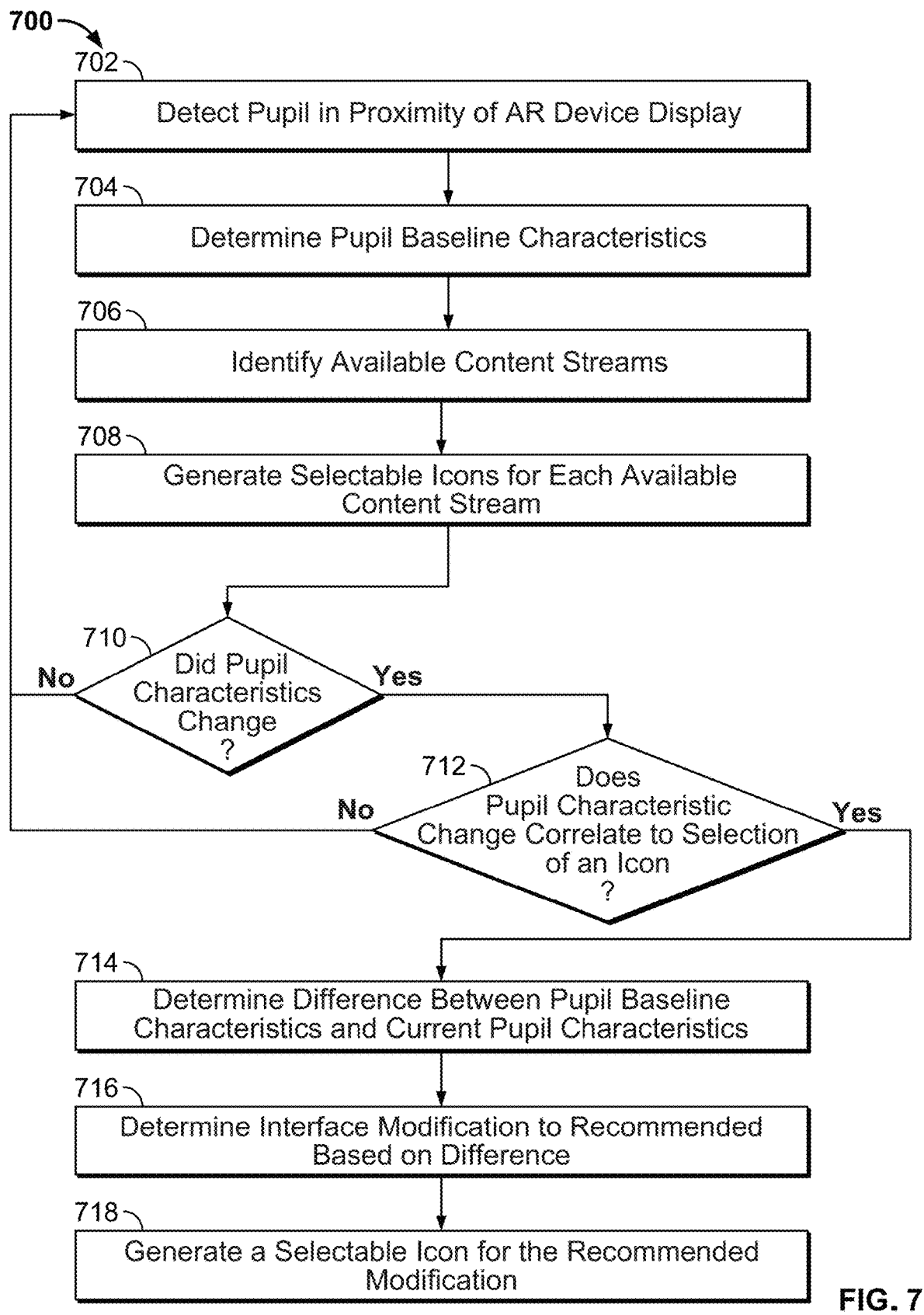
FIG. 7 is a flowchart representing an illustrative process for modifying an AR overlay in response to a pupil characteristic, in accordance with some embodiments of the disclosure.

FIG. 7 is a flowchart representing AR overlay modification process 700 for modifying an AR overlay in response to a pupil characteristic, in accordance with some embodiments of the disclosure. Process 700 may be executed by any or all of the components depicted in FIGS. 1-3 and 8-11B or described in reference to FIGS. 1-6 and 8-11B. Process 700 may comprise all of or fewer of the steps described herein, including exemplary alternative embodiments described herein. Process 700 may be incorporated into process 400 at process block 408 or process block 420, for example.

At 702, a pupil is detected to be within the proximity of the AR device display. For example, in a head-mounted AR device, the AR device display and/or control circuitry thereby may receive an indication from a pupilometer or camera that a user's pupil is positioned to view the display of the AR device. In another example, in an AR device that is not head-mounted, the camera or pupilometer may be separate from the AR display and may be arranged to provide inputs from the pupils while the user is a threshold distance away from the AR display. At 704, baseline characteristics of the detected pupil are determined. Baseline characters may comprise a pupil size, a pupil field of view, a pupil position, and/or a blink rate when the user first starts using the AR device and before the user engages with any interfaces or content.

At 706, available content streams are identified (e.g., as described in process 400 of FIG. 4). At 708, selectable elements are generated for each of the available content streams (e.g., as described in process 400 of FIG. 4). If it is determined that, once the selectable elements are generated, the pupil characteristics did not change (NO at 710), then the process returns to process block 702 and a pupil in proximity of the AR device display is detected. If it is determined, once the selectable elements are generated, that pupil characteristics did change (YES at 710), a determination is made regarding whether the pupil characteristic change correlated to the selection of one of the selectable elements at 712. If it is determined that the pupil characteristic does not correlate to a selection of an element (NO at 712), then the process returns to process block 702 and a pupil in proximity of the AR device display is detected. If it is determined that the pupil characteristic does correlate to a selection of an element (YES at 712), then a difference between the pupil baseline characteristics (e.g., as determined at process block 704) and the current pupil characteristics (e.g., the change determined at process block 710) is determined at 714. For example, the pupil position changes to indicate an intent to view or select one of the selectable elements.

At 716, an interface medication is recommended based on the change determined at process block 714. For example, if the user changed their pupils position such that their pupils now align with a preview of streaming content, then the AR overlay or the AR interface may be prompted to generate a selectable option to view the streaming content. At 718, the selectable element for the recommended modification is generated. For example, a user may change their pupils' positions to align with a settings element and a plurality of interface, overlay, and or device control options may be generated for user selection.

Figure 8:
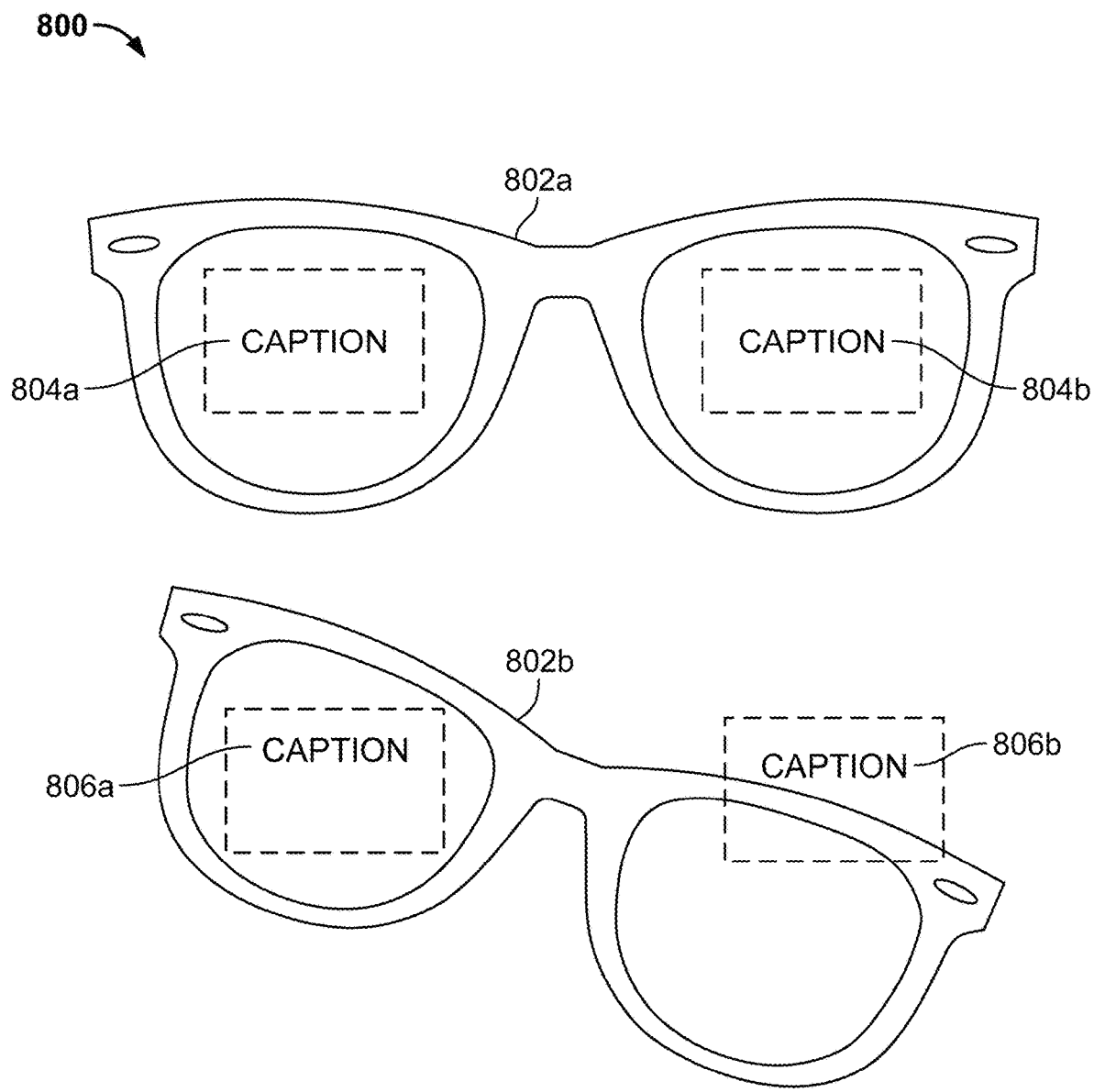
FIG. 8 is an exemplary AR overlay, in accordance with some embodiments of the disclosure.

FIG. 8 depicts exemplary AR overlay 800, which modifies the display of captions in response to a user's head movement while using a head-mounted AR device, in accordance with some embodiments of the disclosure. Overlay 800 may be generated by any or all of the components depicted in FIGS. 1-7 and 9A-11B or described in reference to FIGS. 1-7 and 9A-11B. Overlay 800 may comprise all of or fewer of the overlay components or portions described herein, including exemplary alternative embodiments described herein. Overlay 800 may be generated as part of or in response to either of process 400 or process 500.

Overlay 800 may be generated for a head-mounted AR device comprising at least two screens, wherein each screen aligns with each of a user's eyes. For example, a first screen may be laterally aligned to a second screen (e.g., like a pair of smart glasses). Overlay 800 may first be generated based on AR device position 802a, which, as depicted, enables each of the screens to be level such that captions 804a and 804b can be shown level towards the bottom of a device streaming content. In the event a user of the head-mounted AR device tilts their head (e.g., at an approximately 45 degree downward angle to the right as shown in FIG. 8), then, based on AR device position 802b, captions 806a and 806b are generated in a different position on each of the screens of the AR device and still aligned to a lower border and central to the screen where the streamed content is being generated for display.

Changing the orientation of a user's head (e.g., tilting) also results in changing the orientation of the virtual objects displayed in the user's field of view or in the eye-box, which corresponds to a portion of the AR device display that a user can comfortably and regularly move the user's pupils within. For example, the virtual object or a portion of it can appear outside of the eye-box, and the user's field of view changes, which requires the eyes to start moving in various directions to adapt to the new field of view and to see the virtual content. This can result in a bad user experience. In one embodiment, the AR system can automatically switch between two modes based on context, user's profile, eye movement, historical eye activity (e.g., eye movements, prolonged gazes, and interface interaction actions taken). For example, while operating in a monocular mode, the virtual content is only visible to one of the user's eyes, while the virtual content is visible to both eyes when the AR system is in binocular mode. The direction of the head tilt can therefore automatically enable/disable one of the image sources to force the user to focus on a portion of the superimposed virtual object through one lens/display.

Figure 9B:
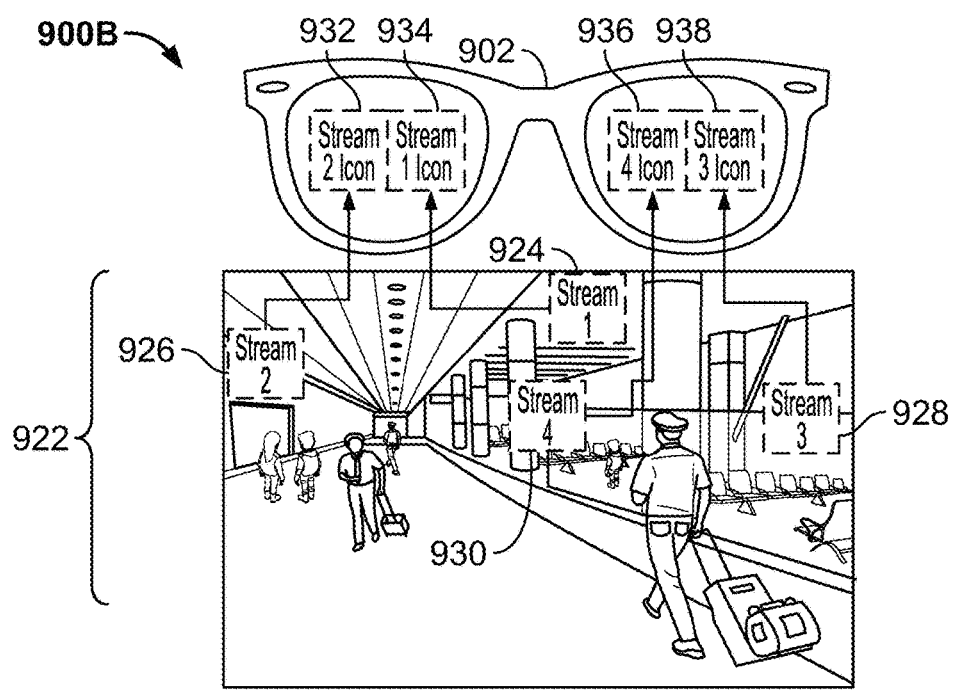

FIGS. 9A and 9B depict exemplary AR overlays 900A and 900B, in accordance with some embodiments of the disclosure. Overlay 900A corresponds to a scenario in which a primary or parent account of the AR device is able to detect and view all available content streams within a household. Overlay 900B corresponds to a scenario in which a user of the AR device is able to detect a plurality of screens in an environment and generate selectable options for each stream (e.g., multiple screens in an airport terminal). Overlays 900A and 900B may be generated by any or all of the components depicted in FIGS. 1-8 and 10-11B or described in reference to FIGS. 1-8 and 10-11B. Overlays 900A and 900B may comprise all of or fewer of the overlay components or portions described herein, including exemplary alternative embodiments described herein. Overlays 900A and 900B may be generated as part of or in response to either of process 400 or process 500.

Overlay 900A is generated on AR device 902. As depicted in FIG. 9A, overlay 900A may be generated on a head-mounted AR device such as a pair of smart glasses. In some embodiments, the AR device may not be head-mounted (not depicted). AR device 902 may be paired with all devices in environment 904. Environment 904 may be a house with multiple users streaming content on multiple devices. Device 906 depicts a smart TV in a first room of environment 904 (e.g., a television in a family or living room). Device 908 depicts a second smart TV in a second room of environment 904 (e.g., a first child's room). Device 910 depicts a personal computer in the second room of environment 904. Device 912 depicts a mobile device in a third room of environment 904 (e.g., a second child's room). Overlay 900A comprises UI elements 914-920, which correspond to each of the streams received on devices 906-912, respectively. UI elements 914-920 may comprise at least one of an image corresponding to content available via each respective media stream being received by each of devices 906-912, a portion of at least one video available via each respective media stream, and at least one identifier of the source of the media stream. In some embodiments, each of UI elements 914-920 may comprise a respective consumption option. For example, each respective consumption option may provide the user of AR device 902 an option for at least one of controlling the respective media stream on the respective remote device (e.g., at least one of devices 906-912), modifying respective display options corresponding to the respective media stream on the respective remote device, controlling the respective media stream on the AR device, and modifying respective display options corresponding to the respective media stream on the AR device.

In some embodiments, overlay 900A receives an input corresponding to an interaction with the at least one of UI elements 914-920 by determining a change in a pupil characteristic of a pupil close to the AR display. The pupil characteristic may comprise at least one of a pupil size, a blink rate, and a light reflection magnitude. In some embodiments, modifying the playing of a respective stream playing on a respective device based on the consumption option comprises executing a modification instruction based on a selection of a consumption option (e.g., one of UI elements 914-920) In some embodiments, the modification instruction comprises at least one of a playback command, a caption setting modification, and an interface display modification for a respective stream or device.

Overlay 900B is generated on AR device 902. As depicted in FIG. 9B, overlay 900B may be generated on a head-mounted AR device such as a pair of smart glasses. In some embodiments, the AR device may not be head-mounted (not depicted). AR device 902 may be paired with all devices in environment 922. Environment 922 may be an airport terminal or a shopping complex with multiple devices streaming content that can be subscribed to by AR device 902 (e.g., as described in the description of FIG. 1). Device 924 depicts a first display within a first and closest distance to AR device 902. Device 926 depicts a second display within a second distance that is larger than the first distance to AR device 902. Device 928 depicts a third display within a third distance that is larger than the second distance to AR device 902. Device 930 depicts a fourth display within a fourth distance that is larger than the third distance to AR device 902. Overlay 900B comprises UI elements 932-938, which correspond to each of the streams received on devices 924-930, respectively. UI elements 932-938 may comprise at least one of an image corresponding to content available via each respective media stream being received by each of devices 924-930, a portion of at least one video available via each respective media stream, and at least one identifier of the source of the media stream. In some embodiments, each of UI elements 932-938 may comprise a respective consumption option. For example, each respective consumption option may provide the user of AR device 902 an option for at least one of controlling the respective media stream on the respective remote device depending on the authorization protocols of each device (e.g., at least one of devices 932-938), modifying respective display options corresponding to the respective media stream on the respective remote device, controlling the respective media stream on the AR device, and modifying respective display options corresponding to the respective media stream on the AR device.

In some embodiments, overlay 900B receives an input corresponding to an interaction with the at least one of UI elements 932-938 by determining a change in a pupil characteristic of a pupil close to the AR display. The pupil characteristic may comprise at least one of a pupil size, a blink rate, and a light reflection magnitude. In some embodiments, modifying the playing of a respective stream playing on a respective device based on the consumption option comprises executing a modification instruction based on a selection of a consumption option (e.g., one of UI elements 932-938) In some embodiments, the modification instruction comprises at least one of a playback command, a caption setting modification, and an interface display modification for a respective stream or device.

Figure 10:
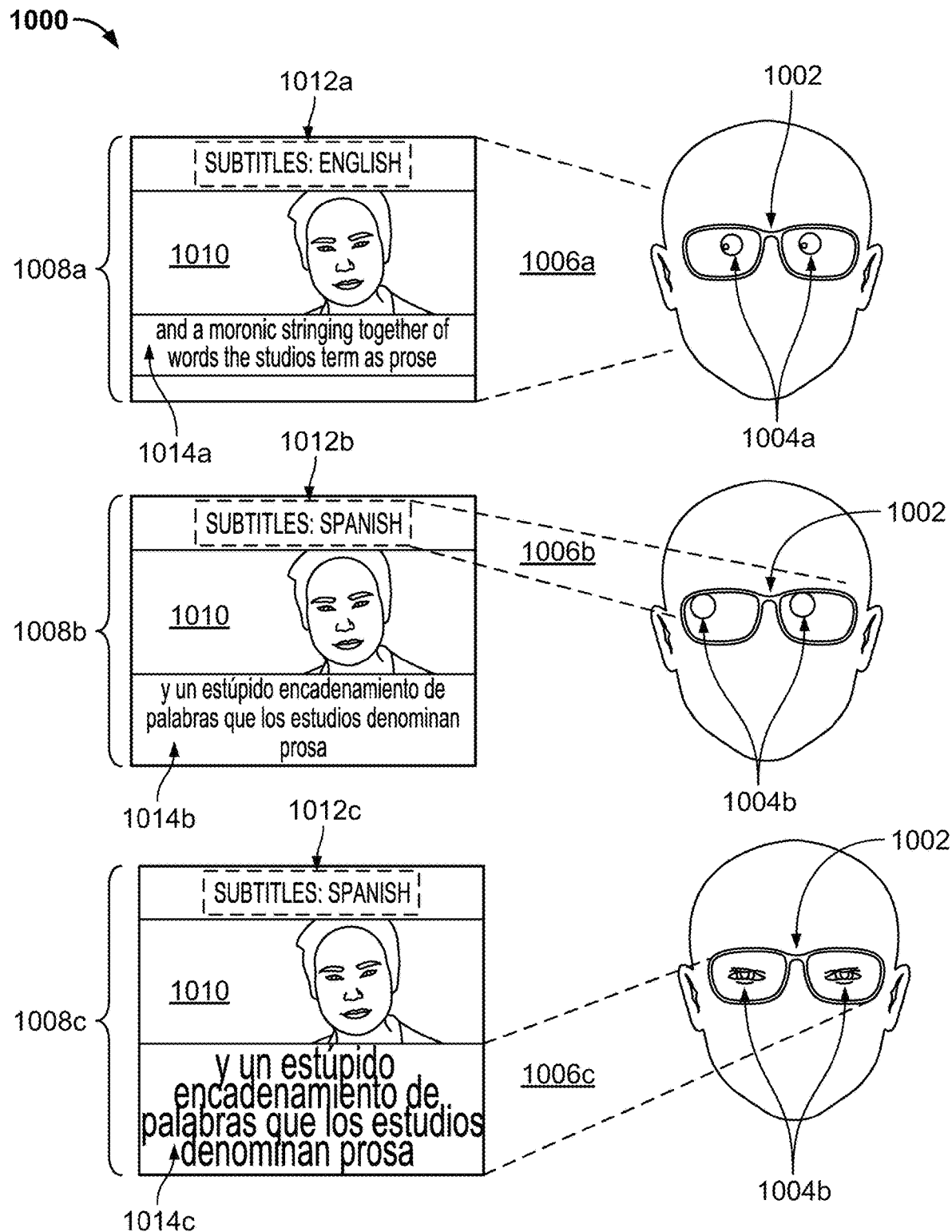
FIG. 10 illustrates a scenario in which the AR overlay is modified in response to a change in a pupil characteristic, in accordance with some embodiments of the disclosure.

FIG. 10 illustrates AR overlay modification scenario 1000, where an AR overlay is modified in response to a change in a pupil characteristic, in accordance with some embodiments of the disclosure. Scenario 1000 may be executed by any or all of the components depicted in FIGS. 1-9B, 11A, and 11B, or described in reference to FIGS. 1-9B, 11A, and 11B. Scenario 1000 may comprise all of or fewer of the steps described herein, including exemplary alternative embodiments described herein. Scenario 1000 may be illustrative of the execution of any or all of either process 400 of FIG. 4 or process 500 of FIG. 5.

AR device 1002 may be a head-mounted AR device such as a pair of smart glasses. In some embodiments, the AR device may not be head-mounted (not depicted). Pupil status 1004a is detected and used to identify field of view 1006a. For example, as depicted pupil status 1004a corresponds to the user looking at display 1008a showing content stream 1010, and field of view 1006a corresponds to a general view of display 1008a as shown through AR device 1002. Display 1008a comprises settings element 1012a (e.g., showing a current subtitle language) and subtitle portion 1014a, which is displayed based on the selected option for settings element 1012a.

Pupil status 1004b is detected and used to identify field of view 1006b. For example, as depicted pupil status 1004b corresponds to the user looking at the top portion of display 1008a showing content stream 1010, and field of view 1006b corresponds to a direct view of settings element 1012b now modified (e.g., 1012a was modified to 1012b to change the preferred subtitle language in response to detecting a change from pupil status 1004a to pupil status 1004b) as shown through AR device 1002. Display 1008b comprises settings element 1012b (e.g., showing a new current subtitle language based on pupil status 1004b corresponding to a modification of the subtitle language) and subtitle portion 1014b, which is displayed in the new selected language shown in settings element 1012b.

Pupil status 1004c is detected and used to identify field of view 1006c. For example, pupil status 1004c corresponds to the user looking at the bottom portion of display 1008c showing content stream 1010, and field of view 1006c corresponds to a direct view of subtitle portion 1014b as shown through AR device 1002. Pupil status 1004c, as depicted corresponds to a user squinting while trying to read subtitle portion 1014b. In response to detecting the user squinting, the font size of subtitle portion 1014b is increased (e.g., at least 125% of the original font size) to stop the user from squinting and return to pupil status 1004a. Display 1008c comprises settings element 1012c and subtitle portion 1014c with the increased font size to prevent the user from squinting. For example, a light sensor can measure the amount of light that is reflected from the user's eyes to detect and classify a specific gesture, such as a squint. A squint might result in the reflection of more light as the user's eyes are closing. The reflection amount, however, changes when the user fully "re-opens" their eyes. The time between such actions and the difference in the amount of light detected by the light sensor can be used to identify a squint or any gesture that might be hindering the user's abilities to comfortably read the displayed text.

Figure 11A:
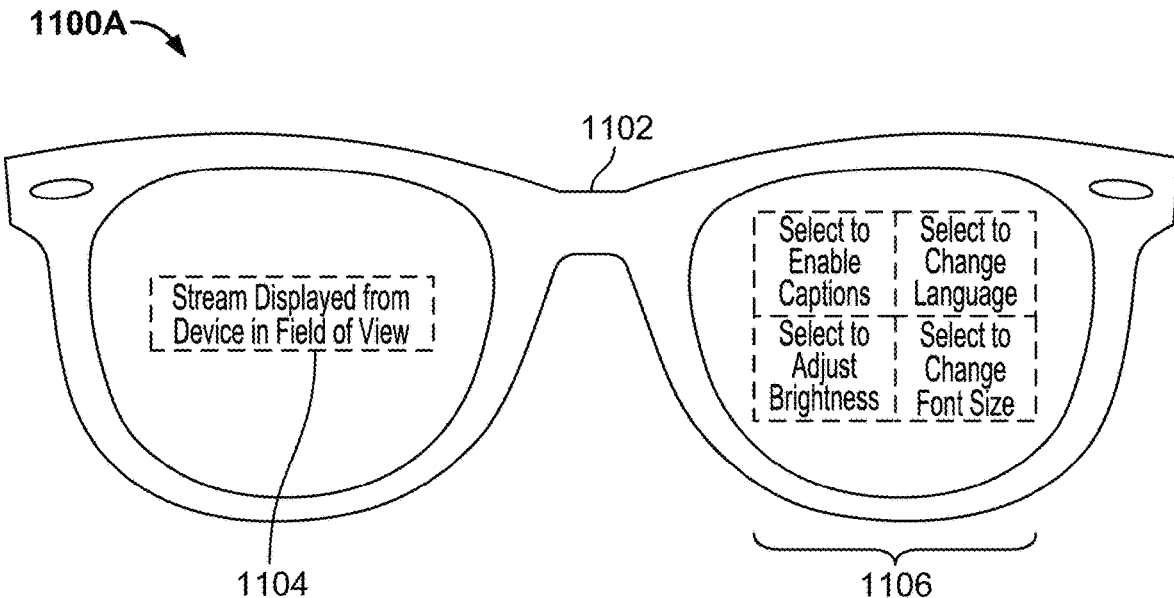
FIGS. 11A and 11B are exemplary AR overlays, in accordance with some embodiments of the disclosure.
Figure 11B:
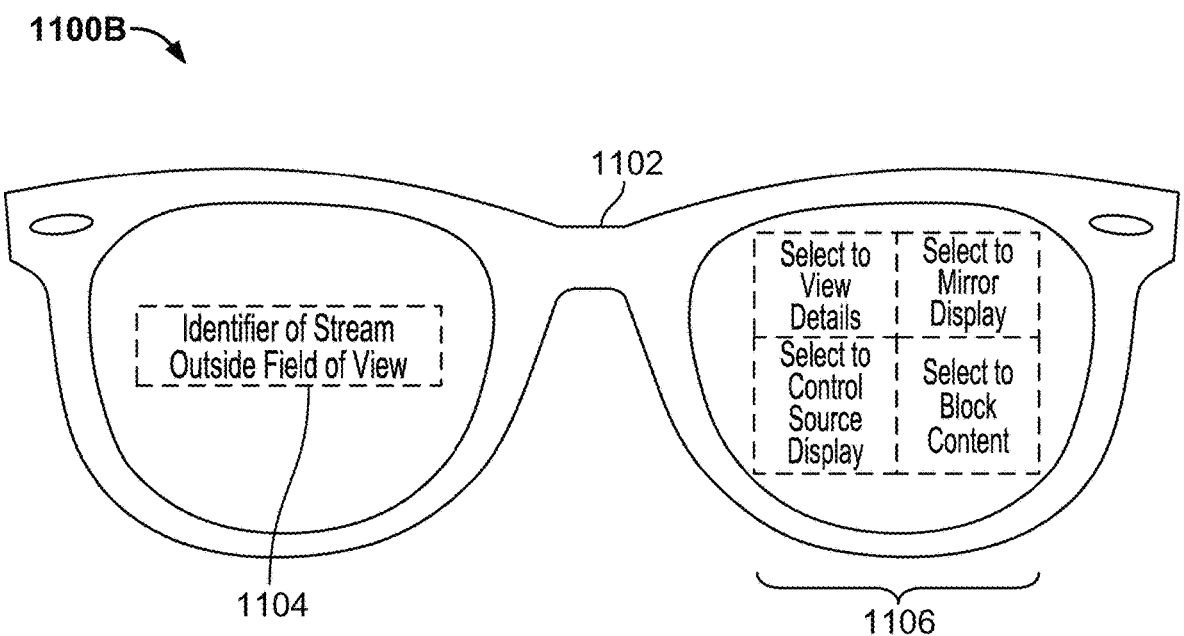

FIGS. 11A and 11B are exemplary AR overlays, in accordance with some embodiments of the disclosure. Overlay 1100A corresponds to a scenario in which an active profile using AR device 1102 is able to detect and view a content stream within a threshold distance and within a field of view of the user of AR device 1102. Overlay 1100B corresponds to a scenario in which a user of AR device is able to detect a plurality of streams but is unable to view the streams within their field of view. Overlays 1100A and 1100B may be generated by any or all of the components depicted in FIGS. 1-10 or described in reference to FIGS. 1-10. Overlays 1100A and 1100B may comprise all of or fewer of the overlay components or portions described herein, including exemplary alternative embodiments described herein. Overlays 1100A and 1100B may be generated as part of or in response to either of process 400 or process 500.

Overlay 1100A is generated for display on AR device 1102. Overlay 1100A may be generated on a head-mounted AR device such as a pair of smart glasses. In some embodiments, the AR device may not be head-mounted (not depicted). Overlay 1100A may comprise portion 1104 and portion 1106. Portion 1104 may be displayed on a separate lens from portion 1106 as depicted in FIG. 11A depending on device and profile settings. Portion 1104 corresponds to an overlay for a stream displayed on a device within the field of view of AR device 1102. Portion 1106 corresponds to an arrangement of display setting UI elements. The display setting UI elements, when selected, are each configured to generate an executable command for at least one of a font size modification, a font style modification, enabling or disabling captions, a language utilized, a brightness modification, a resolution modification, and a color modification. In some embodiments, either of portions 1104 or 1106 may comprise an option to mirror the stream in the display of AR device 1102 in order to provide the user a more immersive experience. In some embodiments, the content being streamed comprises at least one of a video content item and an audio content item. Portions 1104 and 1106 may change depending on the content type (e.g., video or audio) to provide a user of AR device 1102 with appropriate modification options.

Overlay 1100B is generated for display on AR device 1102. Overlay 1100B may be generated on a head-mounted AR device such as a pair of smart glasses. In some embodiments, the AR device may not be head-mounted (not depicted). Overlay 1100B may comprise portion 1108 and portion 1110. Portion 1108 may be displayed on a separate lens from portion 1110 as depicted in FIG. 11B depending on device and profile settings. Portion 1108 corresponds to an overlay for a stream displayed on a device outside the field of view of AR device 1102 (e.g., as shown in FIG. 2). Portion 1110 corresponds to an arrangement of display control UI elements. The display control UI elements, when selected, are each configured to generate an executable command for at least one of generating for display descriptive details corresponding to the stream shown in portion 1108 (e.g., title, maturity ratings, comments), generating a mirrored version of the other device streaming the content, transmitting commands from the AR device to control to the streaming device, and implementing a parental control such as blocking content from the displayed stream. In some embodiments, the content being streamed comprises at least one of a video content item and an audio content item. Portions 1108 and 1119 may change depending on the content type (e.g., video or audio) to provide a user of AR device 1102 with appropriate modification options.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A method, comprising:
   detecting a media stream playing on a device that is outside a field of view of an augmented reality ("AR") device;
   identifying the device receiving the media stream;
   in response to identifying the device receiving the media stream, generating at least one user interface ("UI") element on a display that corresponds to the AR device, wherein the at least one UI element conveys information corresponding to content available via the media stream;
   receiving an input corresponding to the at least one UI element; and
   in response to receiving the input, generating an AR overlay that comprises a mirror of the media stream playing on the device, wherein the AR overlay comprises at least one UI element corresponding to an instruction to control display of the media stream on at least one of the device and the AR device.

2. The method of claim 1, wherein detecting the media stream playing on the device that is outside the field of view of the AR device comprises:
   activating a first local communication network at the AR device;
   determining at least one device is responsive to the first local communication network based on a response corresponding to the at least one device; and
   identifying the media stream playing on the at least one device.

3. The method of claim 1, wherein identifying the device receiving the media stream comprises retrieving a device identifier corresponding to the device receiving the media stream based on at least one of metadata associated with the device receiving the media stream and metadata associated with the media stream.

4. The method of claim 1, wherein identifying the device receiving the media stream comprises:
   identifying a content provider associated with the media stream;
   identifying a plurality of devices within a threshold distance of the AR device;
   retrieving profile information for each of the plurality of devices;
   determining, based on the profile information, which of the plurality of devices is associated with the content provider; and
   in response to determining which of the plurality of devices is associated with the content provider, identifying the device from the plurality of devices that is receiving the media stream.

5. The method of claim 4, wherein identifying the plurality of devices within the threshold distance of the AR device comprises:
   activating a local communication network at the AR device;
   determining a distance corresponding to each of the plurality of devices based on a response associated with a connection to the local communication network corresponding to each of the plurality of devices; and
   comparing the distance to the threshold distance.

6. The method of claim 1, wherein the at least one UI element comprises at least one of a maturity rating, a content stream identifier, a content source identifier, and a user profile identifier.

7. The method of claim 1, wherein the at least one UI element comprises at least one of a portion of at least one video available via the media stream and at least one image corresponding to content available via the media stream.

8. The method of claim 1, wherein receiving the input corresponding to the at least one UI element comprises:
   determining at least one pupil is within an input threshold distance of the AR device;
   determining a first iteration of a pupil characteristic, wherein the first iteration corresponds to a first time stamp;
   determining a second iteration of the pupil characteristic, wherein the second iteration corresponds to a second time stamp later than the first time stamp;
   comparing the first iteration to the second iteration;
   in response to determining the first iteration is different from the second iteration, comparing a magnitude of difference to an input deviation threshold; and
   in response to determining the magnitude meets or exceeds the input deviation threshold, generating an executable instruction based on the at least one UI element corresponding to the pupil characteristic.

9. The method of claim 8, wherein the pupil characteristic comprises at least one of a pupil size, a blink rate, and a light reflection magnitude.

10. The method of claim 1, wherein the AR overlay further comprises at least one UI element which, when associated with the input, is configured to generate an instruction for modifying display of the media stream on at least one of the device and the AR device.

11. A system comprising:
    input/output circuitry configured to:
        receive an input corresponding to at least one UI element;
    control circuitry configured to:
        detect a media stream playing on a device that is outside a field of view of an augmented reality ("AR") device;
        identify the device receiving the media stream;
        in response to identifying the device receiving the media stream, generate at least one user interface ("UI") element on a display that corresponds to the AR device, wherein the at least one UI element conveys information corresponding to content available via the media stream; and in response to receiving the input, generate an AR overlay that comprises a mirror of the media stream playing on the device, wherein the AR overlay comprises at least one UI element corresponding to an instruction to control display of the media stream on at least one of the device and the AR device.

12. The system of claim 11, wherein the control circuitry configured to detect the media stream playing on the device that is outside the field of view of the AR device is further configured to:
  activate a first local communication network at the AR device;
  determine at least one device is responsive to the first local communication network based on a response corresponding to the at least one device; and
  identify the media stream playing on the at least one device.

13. The system of claim 11, wherein the control circuitry configured to identify the device receiving the media stream is further configured to retrieve a device identifier corresponding to the device receiving the media stream based on at least one of metadata associated with the device receiving the media stream and metadata associated with the media stream.

14. The system of claim 11, wherein the control circuitry configured to identify the device receiving the media stream is further configured to:
  identify a content provider associated with the media stream;
  identify a plurality of devices within a threshold distance of the AR device;
  retrieve profile information for each of the plurality of devices;
  determine, based on the profile information, which of the plurality of devices is associated with the content provider; and
  in response to determining which of the plurality of devices is associated with the content provider, identify the device from the plurality of devices that is receiving the media stream.

15. The system of claim 11, wherein the at least one UI element comprises at least one of a maturity rating, a content stream identifier, a content source identifier, and a user profile identifier.

16. The system of claim 11, wherein the at least one UI element comprises at least one of a portion of at least one video available via the media stream and at least one image corresponding to content available via the media stream.

17. The system of claim 11, wherein the input/output circuitry configured to receive the input corresponding to the at least one UI element is further configured to:
  determine at least one pupil is within an input threshold distance of the AR device;
  determine a first iteration of a pupil characteristic, wherein the first iteration corresponds to a first time stamp;
  determine a second iteration of the pupil characteristic, wherein the second iteration corresponds to a second time stamp later than the first time stamp;
  compare the first iteration to the second iteration;
  in response to determining the first iteration is different from the second iteration, compare a magnitude of difference to an input deviation threshold; and
  in response to determining the magnitude meets or exceeds the input deviation threshold, generate an executable instruction based on the at least one UI element corresponding to the pupil characteristic.

18. A non-transitory computer-readable medium having non-transitory computer-readable instructions encoded thereon for generating an augmented reality ("AR") overlay which, when executed by control circuitry, causes the control circuitry to:
  detect a media stream playing on a device that is outside a field of view of an AR device;
  identify the device receiving the media stream;
  in response to identifying the device receiving the media stream, generate at least one user interface ("UI") element on a display that corresponds to the AR device, wherein the at least one UI element conveys information corresponding to content available via the media stream;
  receive an input corresponding to at least one UI element; and
  in response to receiving the input, generate an AR overlay that comprises a mirror of the media stream playing on the device, wherein the AR overlay comprises at least one UI element corresponding to an instruction to control display of the media stream on at least one of the device and the AR device.

* * * * *